US009477341B2

(12) United States Patent
Furutani et al.

(10) Patent No.: US 9,477,341 B2
(45) Date of Patent: *Oct. 25, 2016

(54) LIQUID CRYSTAL DISPLAY DEVICE WITH TOUCH SENSOR, AND ELECTRONIC APPARATUS

(71) Applicant: Japan Display Inc., Tokyo (JP)

(72) Inventors: Naosuke Furutani, Tokyo (JP); Hayato Kurasawa, Tokyo (JP); Makoto Hayashi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/748,568

(22) Filed: Jun. 24, 2015

(65) Prior Publication Data

US 2015/0293639 A1    Oct. 15, 2015

Related U.S. Application Data

(63) Continuation of application No. 13/948,907, filed on Jul. 23, 2013, now Pat. No. 9,092,105.

(30) Foreign Application Priority Data

Jul. 24, 2012  (JP) .................................. 2012-163421
Jul. 19, 2013  (JP) .................................. 2013-151009

(51) Int. Cl.
*G06F 3/038*      (2013.01)
*G06F 3/041*      (2006.01)
(Continued)

(52) U.S. Cl.
CPC ......... *G06F 3/0412* (2013.01); *G02F 1/13338* (2013.01); *G06F 3/044* (2013.01);
(Continued)

(58) Field of Classification Search
USPC .......... 345/173, 174, 204, 175, 172, 87, 214
See application file for complete search history.

(56) References Cited

U.S. PATENT DOCUMENTS 7,009,663 B2    3/2006  Abileah et al.
8,278,571 B2    10/2012  Orsley
(Continued)

FOREIGN PATENT DOCUMENTS

CN    101681221      3/2010
JP    2009-244958    10/2009
(Continued)

OTHER PUBLICATIONS

Chinese Office Action issued Aug. 4, 2015 in corresponding Chinese Application No. 201310311841X.
(Continued)

*Primary Examiner* — Thuy Pardo
(74) *Attorney, Agent, or Firm* — K&L Gates LLP

(57) ABSTRACT

A liquid crystal display device with a touch sensor has a liquid crystal display function and a touch sensor function is providing and includes a first substrate including a pixel electrode and a first electrode; a second substrate including a second electrode; and a liquid crystal layer provided between the first substrate and the second substrate. When the liquid crystal display function is activated, the first and second electrodes are supplied with common voltage. When the touch sensor function is activated, the first electrode is applied with a first signal, and the second electrode is configured to receive the first signal to be a second signal as a touch detecting signal.

9 Claims, 20 Drawing Sheets

(51) Int. Cl.
*G06F 3/044* (2006.01)
*G02F 1/1333* (2006.01)
*G09G 3/36* (2006.01)

(52) U.S. Cl.
CPC ......... *G09G 3/3607* (2013.01); *G09G 3/3648* (2013.01); *G06F 2203/04103* (2013.01); *G09G 2300/0426* (2013.01); *G09G 2330/02* (2013.01)

(56) References Cited

U.S. PATENT DOCUMENTS

| | | | |
|---|---|---|---|
| 8,508,484 B2 | 8/2013 | Mizuhashi et al. | |
| 2008/0309627 A1* | 12/2008 | Hotelling | G02F 1/134363 345/173 |
| 2009/0147191 A1 | 6/2009 | Nakajima et al. | |
| 2010/0026655 A1* | 2/2010 | Harley | G06F 3/044 345/174 |
| 2010/0182273 A1* | 7/2010 | Noguchi | G02F 1/13338 345/174 |
| 2010/0188347 A1* | 7/2010 | Mizuhashi | G02F 1/13338 345/173 |
| 2011/0157094 A1 | 6/2011 | Boer et al. | |
| 2012/0026132 A1 | 2/2012 | Hotelling et al. | |
| 2012/0105350 A1 | 5/2012 | Lee et al. | |
| 2012/0206395 A1 | 8/2012 | Misaki | |
| 2012/0206412 A1 | 8/2012 | Park et al. | |
| 2012/0256861 A1 | 10/2012 | Park | |
| 2012/0313894 A1* | 12/2012 | Hotelling | G02F 1/134363 345/174 |
| 2013/0215086 A1 | 8/2013 | Boer et al. | |
| 2014/0009442 A1* | 1/2014 | Kim | G06F 3/0412 345/174 |
| 2015/0309624 A1* | 10/2015 | Hotelling | G02F 1/134363 345/174 |

FOREIGN PATENT DOCUMENTS

| | | |
|---|---|---|
| JP | 2009-540374 | 11/2009 |
| KR | 10-0322092 | 1/2002 |
| KR | 10-2010-0127164 | 12/2010 |
| TW | 201001010 | 1/2010 |
| WO | 2007146780 | 12/2007 |
| WO | 2007146785 | 12/2007 |
| WO | 2011052392 | 5/2011 |

OTHER PUBLICATIONS

Korean Intellectual Property Office, Notice of Preliminary Rejection issued in connection with Korean Patent Application No. 10-2013-86857, dated Jun. 27, 2014. (10 pages).

Office Action issued in connection with Taiwan Patent Application No. 102126360, dated Apr. 28, 2015. (7 pages).

* cited by examiner

◇ : HORIZONTAL ELECTRIC FIELD MODE

◇ : VERTICAL ELECTRIC FIELD MODE

◇ : VERTICAL ELECTRIC FIELD MODE

DISPLAY UNIT 522
SHUTTER BUTTON 524
523 MENU SWITCH

LENS 532
BODY PART 531
534 DISPLAY UNIT
533 START/STOP SWITCH

543 DISPLAY UNIT
542 KEYBOARD
541 BODY

551 UPPER HOUSING
554 DISPLAY
552 LOWER HOUSING

LIQUID CRYSTAL DISPLAY DEVICE WITH TOUCH SENSOR, AND ELECTRONIC APPARATUS

CROSS REFERENCES TO RELATED APPLICATIONS

The present application is a continuation of U.S. application Ser. No. 13/948,907 filed on Jul. 23, 2013, which claims priority to Japanese Priority Patent Application No. JP 2012-163421 filed in the Japan Patent Office on Jul. 24, 2012, and JP 2013-151009 filed in the Japan Patent Office on Jul. 19, 2013, the entire content of which is hereby incorporated by reference.

BACKGROUND

1. Technical Field

The present disclosure relates to technologies used in a liquid crystal display device (LCD), a touch sensor (also referred to as a touch panel (TP)), a liquid crystal display device with a touch sensor (liquid crystal touch panel module), an electronic apparatus, and the like. Specifically, the present disclosure relates to technologies used in a liquid crystal display device with an in-cell capacitive touch sensor.

2. Description of the Related Art

As a liquid crystal display device with a touch sensor having a liquid crystal display function with a touch sensor function implemented, an in-cell touch panel configuration is employed especially for the purpose of reduction in thickness.

An example of the configuration of a related liquid crystal display device with an in-cell capacitive touch sensor (for example, Japanese Patent Application Laid-open Publication No. 2009-244958 (JP-A-2009-244958)) includes an array substrate, a color filter (CF) substrate, and a liquid crystal layer therebetween that are elements constituting the liquid crystal display panel. The configuration uses a common electrode (referred to as COM) on the CF substrate as a transmitting electrode (referred to as Tx) that is an element constituting the touch sensor function, and a detection electrode on the CF substrate as a receiving electrode (referred to as Rx). That is, the liquid crystal display function and the touch sensor function share the same electrode section and wiring.

In the above-described configuration example, a horizontal electric field mode or a vertical electric field mode may be applied as a driving system of the liquid crystal layer. The horizontal electric field mode is exemplified by fringe field switching (FFS) mode, in-plane switching (IPS) mode, etc. The vertical electric field mode is exemplified by twisted nematic (TN) mode, vertical alignment (VA) mode, electrically controlled birefringence (ECB) mode, etc.

In the case of the horizontal electric field mode, the wiring of the common electrode COM serving as the transmitting electrode Tx is only provided to a substrate (array substrate) on one side. On the other hand, in the case of the vertical electric field mode, the wiring of the common electrode COM serving as the transmitting electrode Tx exists on both top and bottom substrates, which are the array substrate and the CF substrate. That is, the configuration of the vertical electric field mode has one additional wiring layer of the common electrode compared with that of the horizontal electric field mode.

The liquid crystal display device with a touch sensor and the like typically have problems and requirements such as slimming down, space saving, simplification and reduction of manufacturing process and parts, that is, cost reduction by the simplification, and improvement in display quality and touch detection accuracy. Specifically, with regard to the simplification and reduction, employing an in-cell configuration in which an electrode and wiring are shared by different functions as described in the above configuration example enables reducing the number of layers to thereby achieve cost reduction.

An example of the related art of the above-described in-cell liquid crystal display device with a touch sensor is disclosed, for example, in PCT International Publication No. WO2007/070725. This patent document ("TOUCH SCREEN LIQUID CRYSTAL DISPLAY") discloses "liquid-crystal display (LCD) touch screens that integrate the touch sensing elements with the display circuitry."

With regard to the related liquid crystal display devices with an in-cell capacitive touch sensor, specifically with regard to configuration examples of sharing type in which the liquid crystal display function and the touch sensor function shared the same electrode section is shared (for example, as described in JP-A-2009-244958), a transparent electrode made of indium tin oxide (ITO) needs to be deposited, for example, on the color filter of the CF substrate to process a sensor pattern (pattern of the receiving electrode) for the touch sensor function in the manufacturing process of the liquid crystal display device with a touch sensor.

However, the manufacturing process of the liquid crystal display device with a touch sensor of sharing type requires a step for processing the sensor pattern and the like, so that the process is more complicated than that of the related liquid crystal display device with a touch sensor of non-sharing type and the like.

For the foregoing reasons, there is a need for a liquid crystal display device with an in-cell capacitive touch sensor (specifically, of sharing type) with a simplified configuration.

SUMMARY

According to an aspect, a liquid crystal display device with a touch sensor has a liquid crystal display function and a touch sensor function. The liquid crystal device includes a first substrate including a pixel electrode and a first electrode; a second substrate including a second electrode; and a liquid crystal layer provided between the first substrate and the second substrate. When the liquid crystal display function is activated, the first and second electrodes are supplied with common voltage. When the touch sensor function is activated, the first electrode is applied with a first signal, and a second signal is detected through the second electrode.

According to another aspect, an electronic apparatus includes the liquid crystal display device with a touch sensor.

Additional features and advantages are described herein, and will be apparent from the following Detailed Description and the figures.

DETAILED DESCRIPTION

Figure 1:
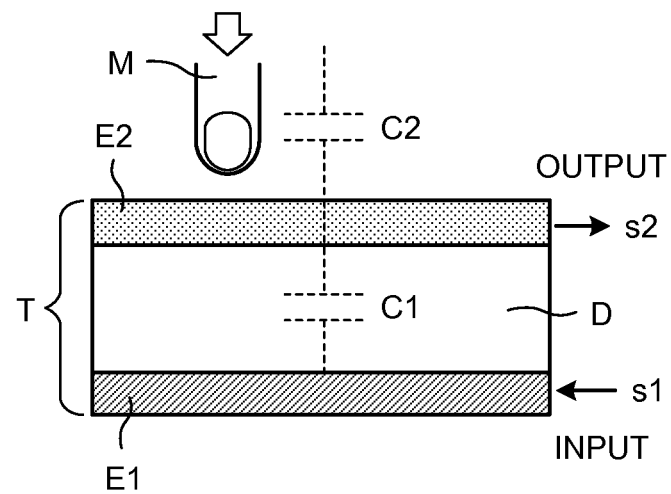
FIG. 1 is a diagram illustrating the principle of a mutual capacitive touch sensor.

Hereinafter, embodiments of the present disclosure will be described in detail with reference to drawings. The same reference numerals are assigned to the same portions in principle throughout all the drawings for explaining the embodiments, and redundant explanation thereof will not be repeated. For the purpose of explanation, it is assumed that a touch panel display plane is along the X-Y direction, a direction orthogonal thereto (direction of the line of sight) is the Z direction, a direction in which a gate line extends is the X direction, and a direction in which a source line extends is the Y direction. In addition to the reference numerals, omission marks such as G, S, Tx, and Rx are used as appropriate. In cross-sectional views, hatching may be partially omitted for the sake of clarification.

The present embodiment provides an electronic apparatus to which the liquid crystal display device with an in-cell capacitive touch sensor, which enables simplification of a sharing type panel (especially, an electrode layer) configuration in a vertical electric field mode, and an electronic apparatus therewith.

1. Liquid Crystal Display Device with Touch Sensor

Before describing about the present embodiment in detail, technologies about the liquid crystal display device with a touch sensor will be sequentially described hereinafter for the sake of clarity.

1-1. Principle of Touch Panel (1)

Figure 2:
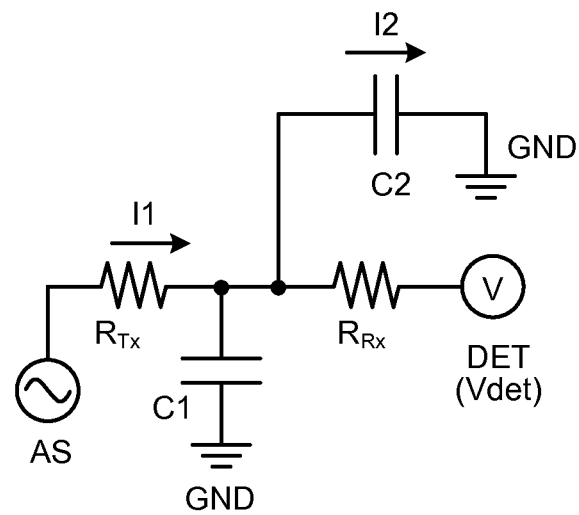
FIG. 2 is a diagram illustrating the principle of the mutual capacitive touch sensor.
Figure 3:
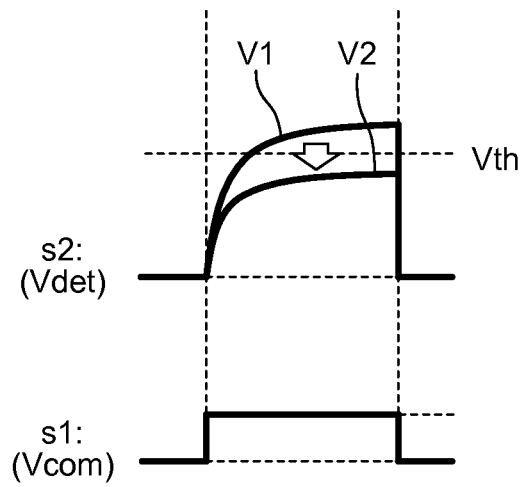
FIG. 3 is a diagram illustrating the principle of the mutual capacitive touch sensor.

FIG. 1, FIG. 2, and FIG. 3 are diagrams illustrating the basic principle of a mutual capacitive touch sensor (touch panel). The present embodiment also complies with the principle. FIG. 1 is a diagram illustrating a basic structure of a touch sensor (touch panel) T. FIG. 2 is a diagram illustrating an equivalent circuit of FIG. 1. FIG. 3 is a diagram illustrating a signal voltage at the time of touch detection in FIG. 1 and FIG. 2. The touch sensor may be referred to as an input/output device in some cases in this specification.

The touch panel T illustrated in FIG. 1 has a configuration including a touch drive electrode E1 (transmitting electrode Tx) and a touch detection electrode E2 (receiving electrode Rx) that are arranged opposed to each other with a dielectric D interposed therebetween, by which a capacitor (in other words, a capacitative element) C1 is formed. The capacitor C1 is an electrostatic capacitor for touch detection. The presence or absence of touching is detected from a change in the capacitor C1 due to the proximity of an electric conductor M, such as a finger, to the surface on the touch detection electrode E2 side. As illustrated in FIG. 2, one end of the capacitor C1 is connected to an alternating current signal source AS via a resistor $R_{Tx}$, and is connected to a voltage detector DET via a resistor $R_{Rx}$, and the other end is grounded. To turn on the touch sensor function, the voltage of a first signal s1 that is a touch driving signal in an alternating current square wave is applied to the touch drive electrode E1 from the alternating current signal source AS. Then, electrical current flows via the capacitor C1, and the voltage of a second signal s2 that is a touch detection signal is detected (output) at the voltage detector DET. The input first signal s1 illustrated in FIG. 3 is voltage in an alternating current square wave having a predetermined frequency. The output second signal s2 (detecting voltage Vdet) is voltage V1 in the absence of touching, and changes to voltage V2 in the presence of touching.

In a state where the electric conductor M, such as a finger, is not close to the touch detection electrode E2 on the front side of the touch panel T (in the absence of touching), electrical current I1 corresponding to the capacitance value of the capacitor C1 flows according to the charge and discharge of the capacitor C1 in response to the input of the first signal s1. At this time, the shape of potential (detecting voltage Vdet) of the touch detection electrode E2 at the other end of the capacitor C1 detected by the voltage detector DET is the voltage V1 of the second signal s2. During the absence of touching, the voltage V1 is maintained substantially constant.

In a state where the electric conductor M is close to the touch detection electrode E2 on the front side of the touch panel T (in the presence of touching), the capacitor C2 formed by the electric conductor M is added to the capacitor C1 in series. In this state, the electrical current I1 and electrical current I2 corresponding to the capacitance values of the capacitor C1 and the capacitor C2 flow according to the charge and discharge of the capacitor C1 and the capacitor C2, respectively. At this time, the shape of potential (detecting voltage Vdet) of the touch detection electrode E2 at the other end of the capacitor C1 detected by the voltage detector DET is the voltage V2 of the second signal s2 due to decrease in electric field by the electric conductor M. The electric potential of the touch detection electrode E2 is the electric potential of a divided voltage determined by the electrical current values of the electrical current I1 and the electrical current I2 flowing via the capacitor C1 and the capacitor C2, respectively. Accordingly, the voltage V2 of the second signal s2 in the presence of touching is lower than the voltage V1 in the absence of touching. In the voltage detector DET or a corresponding touch detection circuit, the detecting voltage Vdet (the voltage V1 or the voltage V2) of the second signal s2 is compared with a predetermined threshold voltage Vth. If the detecting voltage Vdet is smaller than the threshold voltage Vth as with the voltage V2 in FIG. 3, for example, the presence of touching is detected. Alternatively, the detection may be performed by comparing the amount of change from the voltage V1 to the voltage V2 against a predetermined threshold voltage Vth.

1-2. Principle of Touch Panel (2)

Figure 4:
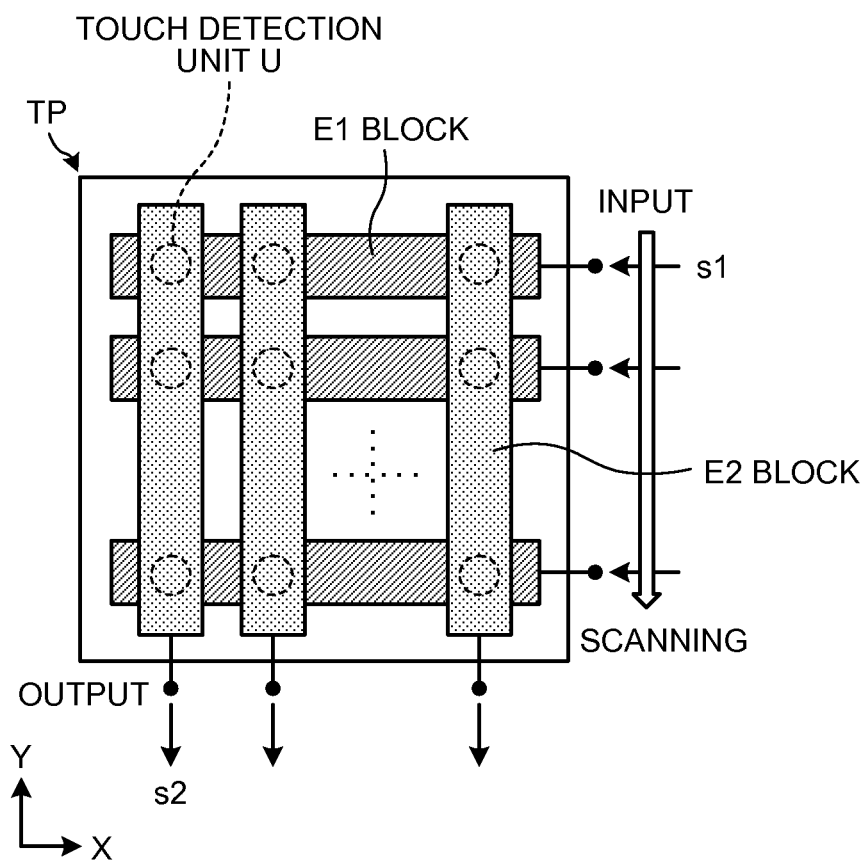
FIG. 4 is a diagram illustrating a configuration example of a touch detection region (touch detection unit U) in a touch panel.
Figure 5:
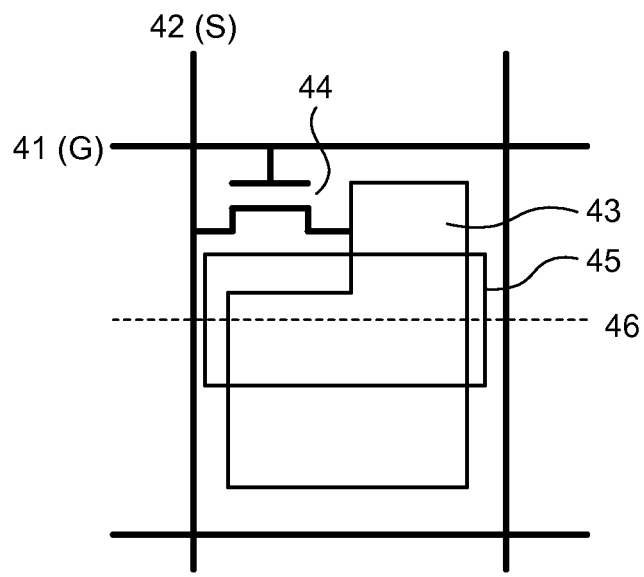
FIG. 5 is a diagram illustrating a configuration of a pixel (cell) in a TFT-LCD.

FIG. 4 is a diagram illustrating a configuration example of a touch detection region (touch detection unit U) in the touch panel T illustrated in FIG. 5. In a plane constituting a touch detection region of the panel (herein referred to as the X-Y direction), provided are a wiring pattern of the touch drive electrode E1 (transmitting electrode Tx) and a wiring pattern of the touch detection electrode E2 (receiving electrode Rx), and the touch detection unit U is constituted of a capacitor formed at each intersecting part thereof. For example, the touch drive electrode E1 (transmitting electrode Tx) is formed in a plurality of lines parallel to the X direction of the plane of a first substrate, and the touch detection electrode E2 (receiving electrode Rx) is formed in a plurality of lines parallel to the Y direction of the plane of a second substrate. The lines of the touch drive electrode E1 and the touch detection electrode E2 may have a configuration with blocks each corresponding to a plurality of pixel lines of a liquid crystal display device, for example. In FIG. 4, for example, a plurality of pixel lines correspond to one block. For example, in response to sequential application (scanning) of the first signal s1 to a group of E1 blocks from a driver, the touch detection unit U corresponding to one or more touch positions in the touch detection region may be detected by calculation processing based on the second signal s2 detected (output) from a group of E2 blocks.

The configuration is not limited to the example described above. For example, the touch drive electrode E1 (transmitting electrode Tx) may be formed as a solid layer on the surface of the first substrate, and the touch detection electrode E2 (receiving electrode Rx) may be formed in a matrix in a unit of divided region in the X direction and the Y direction on the surface of the second substrate. The resolution of touch detection depends on the design of the pattern. In this specification, "solid layer" denotes a layer that is not processed into a predetermined shape after deposition.

1-3. Configuration of TFT-LCD Pixel

Figure 6:
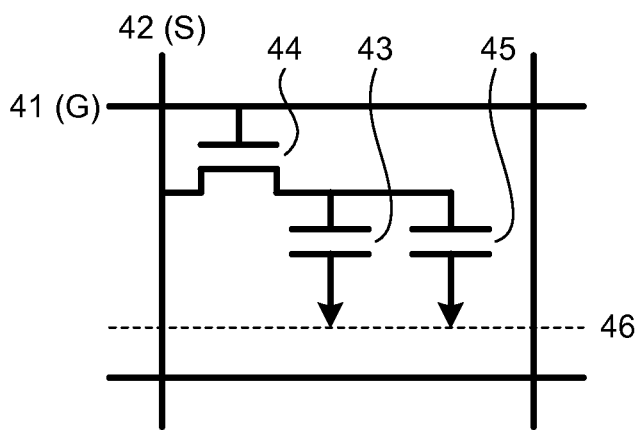
FIG. 6 is a diagram illustrating a configuration of a pixel (cell) in a TFT-LCD.

FIG. 5 is a diagram illustrating the configuration of a pixel (cell) in a TFT-LCD. FIG. 6 is a diagram illustrating an equivalent circuit corresponding to the configuration in FIG. 5. As illustrated in FIG. 5, the pixels (cells) are configured in a matrix by intersecting of gate lines 41 (gate lines G) parallel to the horizontal (X) direction and source lines 42 (source lines S) parallel to the vertical (Y) direction. Each of the gate lines 41 (gate lines G) is connected to a gate electrode of a TFT 44, and each of the source lines 42 (source lines S) is connected to a source electrode of the TFT 44. One of the terminals of a pixel capacitor 43 is connected to a drain electrode of the TFT 44. Each pixel has a holding capacitor 45 connected to a holding capacitor line 46 (or a common electrode) parallel to the X direction. FIG. 6 illustrates an equivalent circuit corresponding to the configuration of FIG. 5. One of the terminals of the pixel capacitor 43 and one of the terminals of the holding capacitor 45 are connected to the drain electrode of the TFT 44. The other terminal of the pixel capacitor 43 and the other terminal of the holding capacitor 45 are connected as the holding capacitor line 46, and common voltage is supplied thereto.

1-4. Liquid Crystal Display Device with Touch Sensor (Non-Sharing Type)

The touch panel T may have an in-cell type configuration provided in the liquid crystal display panel (in-cell liquid crystal display device with a touch sensor). When the vertical electric field mode is applied as the drive system of the liquid crystal layer, the first substrate (array substrate) has a first common electrode section COM1 and the second substrate (CF substrate) has a second common electrode section COM2. When the horizontal electric field mode is applied, the first substrate (array substrate) has the common electrode COM.

1-5. In-cell Liquid Crystal Display Device with Touch Sensor (Sharing Type)

Figure 18:
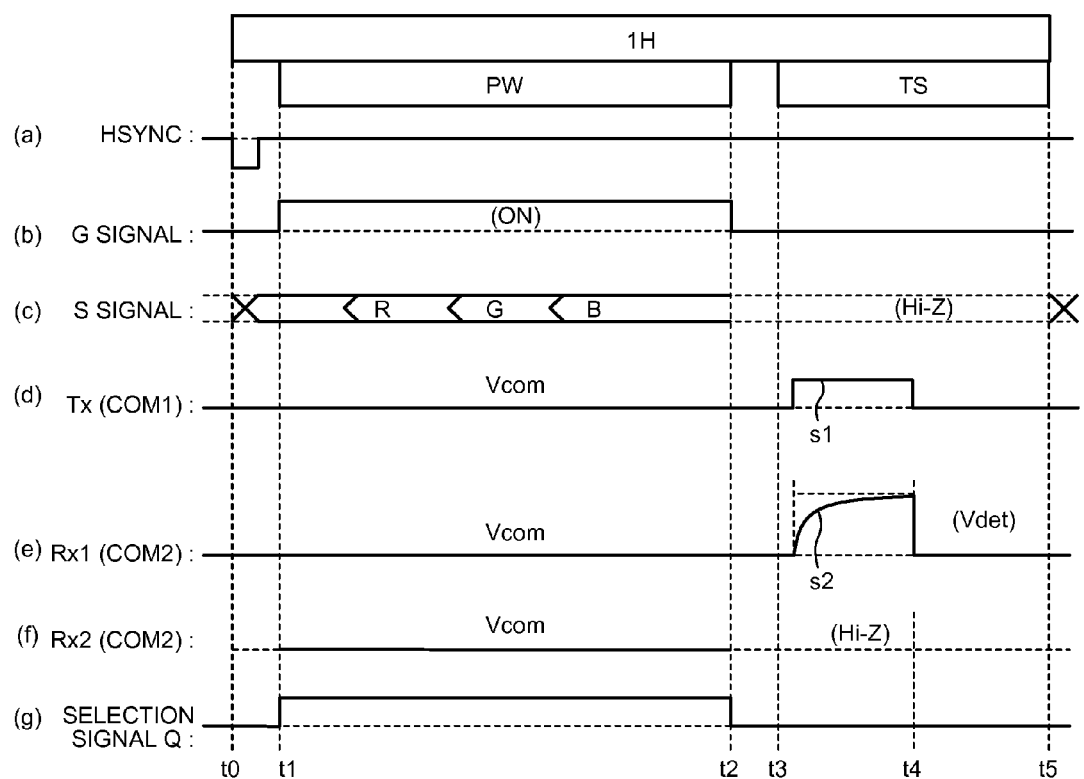
FIG. 18 is a timing chart of driving waveforms of the liquid crystal touch panel module of the third embodiment.

The in-cell liquid crystal display device with a touch sensor may have a simplified configuration (sharing type) in which a common electrode section originally included in the liquid crystal display device is also used as part of electrodes constituting the touch sensor (specifically, the touch drive electrode E1) (for example, see JP-A-2009-244958). A common driving signal (common voltage) applied to the common electrode section for liquid crystal display is also used as a signal for touch sensor. As for the drive system, signals for respective functions are applied to the same electrode section in a time division manner (FIG. 18 to be described later).

In the case of the sharing type and the vertical electric field mode (TN, VA, ECB, and the like), the second common electrode section COM2 on the second substrate (CF substrate) is also used (shared) as the transmitting electrode Tx.

In the vertical electric field mode, an electric field VE is generated in the liquid crystal layer in the vertical direction (Z direction) through the common driving signal (common voltage) to the upper and lower common electrode sections (the common electrode COM1 and the common electrode COM2) and a pixel signal to the terminals of the pixel capacitor, so that the state of each pixel is controlled (modulated).

In the case of the sharing type and the horizontal electric field mode (FFS, IPS, and the like), the common electrode COM on the first substrate (array substrate) is also used (shared) as the transmitting electrode Tx of the touch sensor function, and the receiving electrode Rx is provided on the second substrate (CF substrate). In the horizontal electric field mode, an electric field in the horizontal direction (X-Y direction) is generated in the liquid crystal layer through the common driving signal (common voltage) to the common electrode COM and the pixel signal to the terminals of the pixel capacitor, so that the state of each pixel is controlled (modulated).

1-6. First Comparative Example

Sharing Type—Horizontal Electric Field Mode

Figure 7:
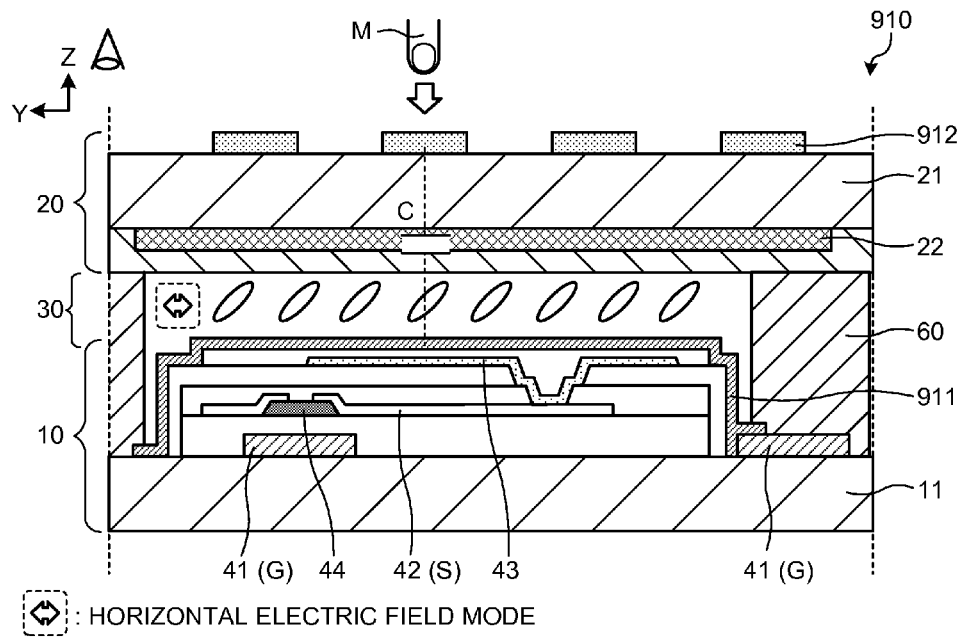
FIG. 7 is a diagram illustrating a configuration example of a sharing type liquid crystal display device in a horizontal electric field mode as a first comparative example.

FIG. 7 illustrates the schematic configuration of a main part in the case of the sharing type and the horizontal electric field mode (first comparative example). A panel section 910 of the liquid crystal display device with a touch sensor includes the common electrode COM (including a terminal of the holding capacitor 45 and a terminal of the holding capacitor line 46), which is also used (shared) as the transmitting electrode Tx, as the first electrode 911. The panel section 910 includes a pattern of the receiving electrode Rx as the second electrode 912 (receiving electrode Rx) on the front side of a CF substrate 20. The array substrate 10 includes a glass substrate 11 on which the gate lines 41 (gate lines G), the source lines 42 (source lines S), the pixel capacitors 43, the TFTs 44, the first electrode 911 serving as the transmitting electrode Tx and the common electrode COM, an insulating layer, and the like are formed. The CF substrate 20 includes a glass substrate 21 having an inner surface (a side adjacent to a liquid crystal layer 30) on which a color filter 22, the insulating layer, and the like are formed. The second electrode 912 (receiving electrode Rx) is formed on the front side (line of sight side) of the CF substrate 20. The first electrode 911 (transmitting electrode Tx) and the second electrode 912 (receiving electrode Rx) constitute the capacitor C for touch sensor.

1-7. Second Comparative Example

Sharing Type—Vertical Electric Field Mode

Figure 8:
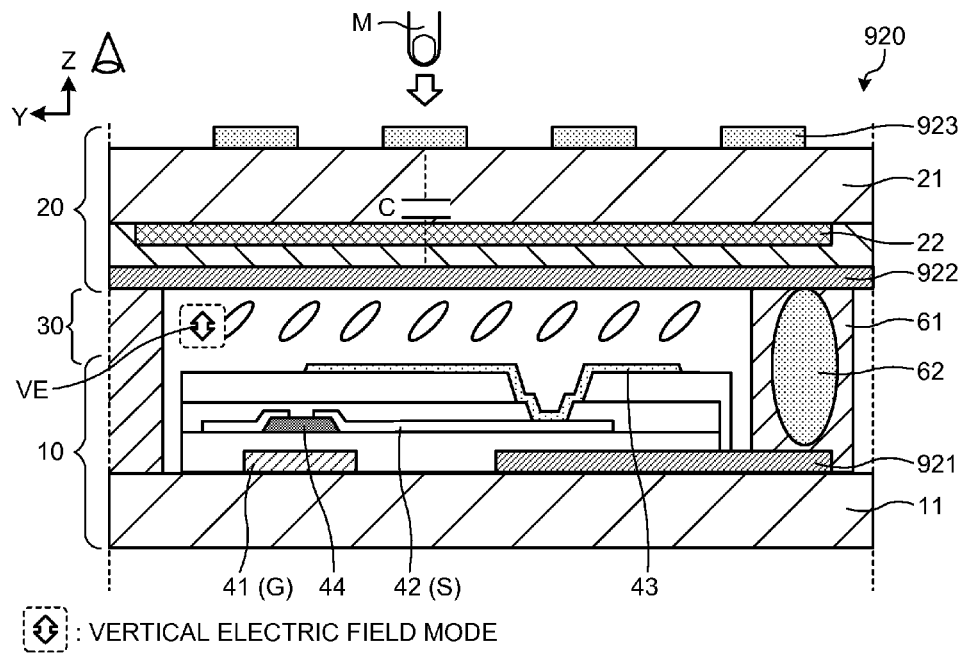
FIG. 8 is a diagram illustrating a configuration example of a sharing type liquid crystal display device in a vertical electric field mode as a second comparative example.

FIG. 8 illustrates the schematic configuration of a main part in the case of the sharing type and the vertical electric field mode (second comparative example). In a panel section 920 of the liquid crystal display device with a touch sensor, the first common electrode section COM1 provided on the array substrate 10 is electrically connected to the second common electrode section COM2 provided on the CF substrate 20 via a vertical conducting part 61 (including a conductive particle 62). The first common electrode section COM1 and the second common electrode section COM2, which are also used (shared) as the transmitting electrode Tx (the transmitting electrode Tx1 and the transmitting electrode Tx2), are provided as the first electrode 921 and the second electrode 922, respectively. The pattern of the receiving electrode Rx as a third electrode 923 is provided on the front side of the CF substrate 20. The array substrate 10 includes the glass substrate 11 on which the gate lines 41 (gate lines G), the source lines 42 (source lines S), the pixel capacitors 43, the TFTs 44, the first electrode 921 serving as the transmitting electrode Tx1 and the common electrode COM1, an insulating layer, and the like are formed. The CF substrate 20 includes the glass substrate 21 having an inner side (a side adjacent to the liquid crystal layer 30) on which the color filter 22, the insulating layer, the second electrode 922 serving as the transmitting electrode Tx2 and the common electrode COM2, and the like are formed. The third electrode 923 (receiving electrode Rx) is formed on the front side (line of sight side) of the CF substrate 20. The second electrode 922 (transmitting electrode Tx2) and the third electrode 923 (receiving electrode Rx) constitute the capacitor C for touch sensor.

2. First Embodiment

On the basis of the above description, a first embodiment will be described with reference to FIG. 9 and the like. In the configuration of the first embodiment, in contrast to the second comparative example (FIG. 8), the first common electrode section COM1 on the array substrate 10 is used as the transmitting electrode Tx, the second common electrode section COM2 at the inner side on the CF substrate 20 is used as the receiving electrode Rx, and the pattern layer of the receiving electrode Rx on the front surface of the CF substrate 20 is eliminated.

In the case of the panel section 920 of the liquid crystal display device with a touch sensor in the second comparative example (of the vertical electric field mode and the sharing type), with regard to the liquid crystal display function, wiring layers of the common electrode COM (the common electrode COM1 and the common electrode COM2) are provided to both the array substrate 10 and the CF substrate 20, which are the upper and lower substrates. That is, a first common electrode wiring layer (common electrode COM1) is provided on the array substrate 10 and a second common electrode wiring layer (common electrode COM2) is provided at the inner side on the CF substrate 20. Those wiring layers are electrically connected through a frame part (non-display area) or the like on the outer side of a display area. With reference to FIG. 8, the first electrode 921 serving as the transmitting electrode Tx1 and the common electrode COM1 and the second electrode 922 serving as the transmitting electrode Tx2 and the common electrode COM2 are connected through the vertical conducting part 61. Further, in the second comparative example, the pattern of the receiving electrode Rx, which is made of ITO or the like, is provided on the outer side (front side) of the CF substrate 20.

On the basis of the characteristics of the comparative examples, in the first embodiment (FIG. 9), a panel section 1 of the liquid crystal display device with a touch sensor of the vertical electric field mode and the sharing type has a simplified configuration by sharing an electrode and a wiring layer of each function of the liquid crystal display and the touch sensor, as described below. That is, the first common electrode wiring layer (the common electrode COM1 and the transmitting electrode Tx1) on the array substrate 10 is used as a monolayer touch drive electrode (transmitting electrode Tx), the second common electrode wiring layer (the common electrode COM2) on the CF substrate 20 is newly also used as the touch detection electrode (receiving electrode Rx), and an Rx pattern on the front surface of the CF substrate 20 is eliminated. That is, the panel section 1 of the liquid crystal display device with a touch sensor in the first embodiment has a configuration in which a panel or a substrate structure is simplified so that the number of electrode layers is lower than that in the comparative example (FIG. 8) by one. Accordingly, cost reduction and the like are achieved by the simplification of the manufacturing process and steps of the panel.

2-1. Liquid Crystal Display Device with Touch Sensor (1)

Figure 9:
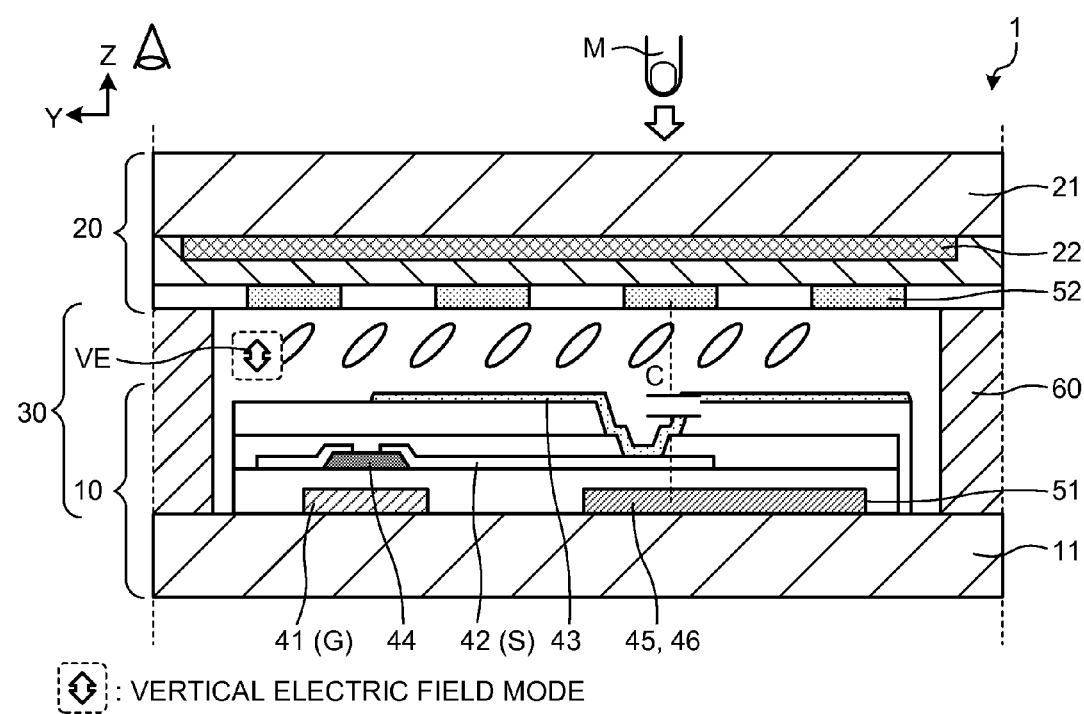
FIG. 9 is a cross-sectional view illustrating a schematic configuration of a main part of a panel section of a liquid crystal display device with a touch sensor in a first embodiment of the present disclosure.

FIG. 9 illustrates the (Y-Z cross sectional) schematic configuration of a main part of the panel section 1 of the liquid crystal display device with a touch sensor in the first embodiment. The panel section 1 of the liquid crystal display device with a touch sensor includes the array substrate 10 and the CF substrate 20 opposed to each other, and the liquid crystal layer 30 therebetween. The liquid crystal layer 30 is driven in the vertical electric field mode. As the sharing type, a first electrode 51 serving as the transmitting electrode Tx and the common electrode COM1 is provided on the array substrate 10, and a second electrode 52 serving as the receiving electrode Rx and the common electrode COM2 is provided on the inner surface (a side adjacent to the liquid crystal layer 30) on the CF substrate 20. The capacitor C for touch sensor is formed between the first electrode 51 serving as the transmitting electrode Tx and the second electrode 52 serving as the receiving electrode Rx.

The first electrode 51 functions as both the first common electrode wiring layer (common electrode COM1) of the liquid crystal display function and the touch drive electrode (transmitting electrode Tx) of the touch sensor function. In the first electrode 51, a pattern of the transmitting electrode Tx for touch driving is formed using a transparent electrode made of ITO. The common electrode COM1 includes a terminal of the holding capacitor 45 provided for each pixel, the holding capacitor line 46 thereof, and the like. That is, the first electrode 51 serving as the common electrode COM1 forms the holding capacitor.

The second electrode 52 functions as both the second common electrode wiring layer (common electrode COM2) of the liquid crystal display function and the touch detection electrode (receiving electrode Rx) of the touch sensor function. In the second electrode 52, a pattern of the receiving electrode Rx for touch detection is formed using the transparent electrode made of ITO.

The array substrate 10 includes the glass substrate 11 on which the gate lines 41 (gate lines G), the source lines 42 (source lines S), the pixel capacitors 43, the TFTs 44, the holding capacitors 45, the holding capacitor lines 46, the first electrode 51 serving as the transmitting electrode Tx and the common electrode COM1, the insulating layer, and the like are formed. The first electrode 51 includes a terminal of the holding capacitor 45 and the holding capacitor line 46. The gate lines 41 (gate lines G) are arranged in such a manner that a plurality of lines extend in parallel to the X direction with a wiring pattern of metal and the like. The source lines 42 (source lines S) are arranged in such a manner that a plurality of lines extend in parallel to the Y direction with a wiring pattern of metal and the like. The pixel capacitor 43 has a pattern of the transparent electrode made of ITO or the like as a terminal, and respective pixel capacitor parts are formed corresponding to a plurality of pixels formed in a matrix in the display area. The pixel capacitor 43 is formed on the insulating layer and has a configuration in which the liquid crystal layer 30 is arranged thereon via an alignment film. The terminal of the pixel capacitor 43 is also referred to as a pixel electrode.

The CF substrate 20 includes the glass substrate 21 having an inner surface (a side adjacent to the liquid crystal layer 30) on which the color filter 22, the insulating layer, the second electrode 52 serving as the receiving electrode Rx and the common electrode COM2, and the like are formed. For example, the color filter 22 has a pattern of periodic arrangement of each color of red (R), green (G), and blue (B). Either one of the colors R, G, and B is associated to each one pixel (subpixel).

The liquid crystal layer 30 is a layer in which the orientation of the liquid crystal is controlled according to an electric field state due to applied voltage so as to modulate transmitted light. The liquid crystal layer 30 adopts the vertical electric field mode, and the state of each pixel is modulated according to an electric field state generated by voltage applied by the upper and lower electrodes of the liquid crystal layer 30 (a common driving signal (common voltage Vcom) and a pixel signal of the pixel capacitor 43). The upper and lower substrates (the array substrate 10 and the CF substrate 20) are physically connected, for example, by a sealing part 60 at the frame part or the like of the outer side of the display area, and thereby the liquid crystal layer 30 is sealed.

Unlike the comparative examples (for example, FIG. 8), the first electrode 51 and the second electrode 52 are not electrically connected via the vertical conducting part 61 and the like, and are independently driven by drivers (FIG. 17 to be described later) each connected to the first electrode 51 or the second electrode 52.

FIG. 9 does not illustrate a polarizing plate (provided below the array substrate 10 and/or above the CF substrate 20), the orientation film (provided between the upper and lower substrates and the liquid crystal layer 30), and the like that are general elements included in the panel section 1 of the liquid crystal device with a touch sensor. The panel section 1 may include other additional elements (an antistatic layer, a protective film, and the like), which are not illustrated.

3. Second Embodiment

A second embodiment will be described with reference to FIG. 12 to FIG. 14, for example. In the first embodiment, a distance between the first electrode 51 serving as the transmitting electrode Tx and the second electrode 52 serving as the receiving electrode Rx is relatively short so that the capacitance formed therebetween may increase. Such an increase of the capacitance may have some effect on the sensibility of the touch detection. Accordingly, in the second embodiment, the pattern designs are devised as follows for the first electrode 51 and the second electrode 52.

3-1. Liquid Crystal Display Device with Touch Sensor (2)

Figure 10:
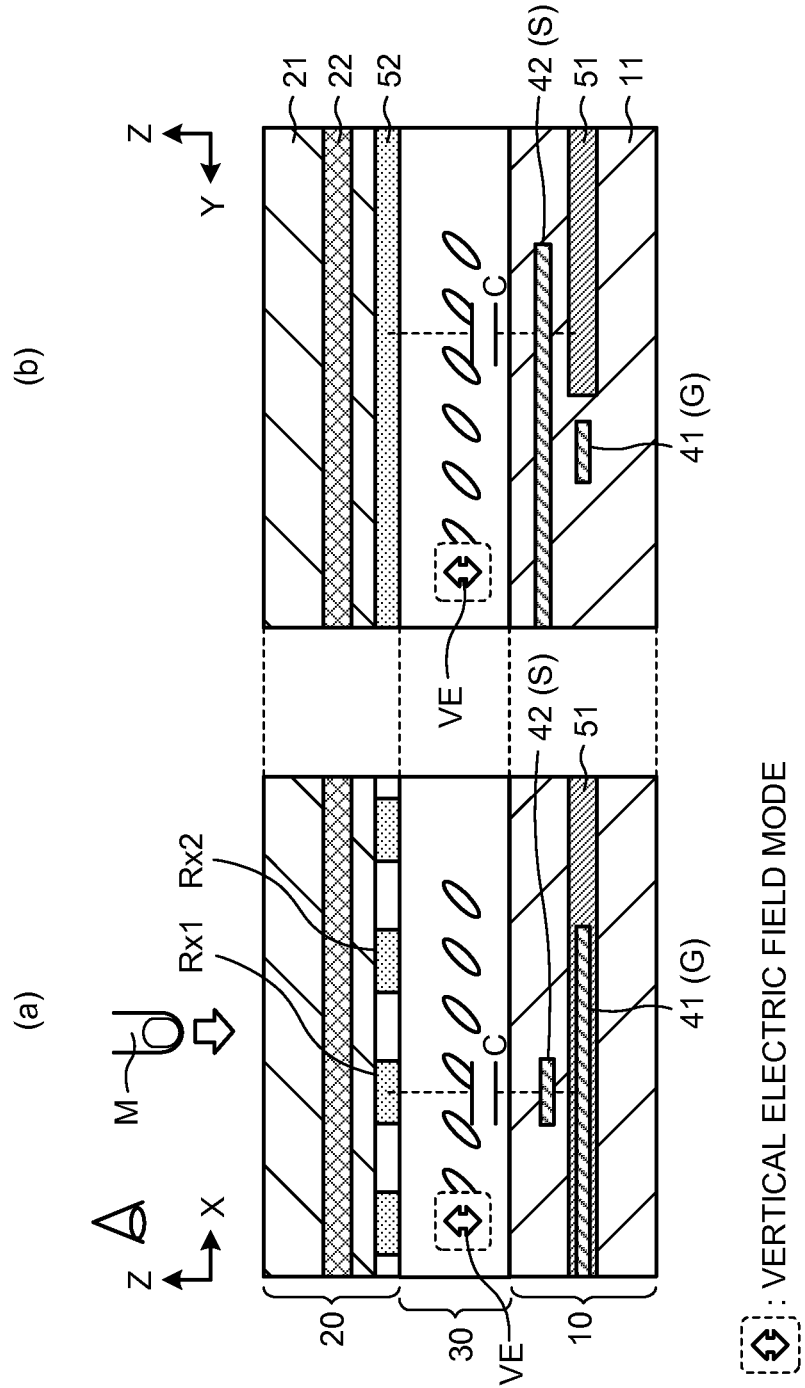
FIG. 10 is a cross-sectional view illustrating the schematic configuration of a main part of a panel section of a liquid crystal display device with a touch sensor in a second embodiment of the present disclosure.

FIG. 10 illustrates the schematic configuration of a main part of the panel section 1 of the liquid crystal display device with a touch sensor in the second embodiment. FIG. 10(*a*) is a diagram illustrating the X-Z cross section, and FIG. 10(*b*) is a diagram illustrating the Y-Z cross section. On the array substrate 10, provided are the gate lines G, the source lines S, the pixel capacitors 43, and a wiring layer of the first electrode 51 serving as the transmitting electrode Tx and the common electrode COM1 and including a terminal of the holding capacitance 45 and the holding capacitance lines 46. FIG. 10 schematically illustrates the positions and overlaps of respective components. For example, the gate lines G and the first electrode 51 serving as the transmitting electrode Tx and the common electrode COM1 illustrated in FIG. 10 are formed in the same layer in the Z direction (similarly to FIG.

Figure 11:
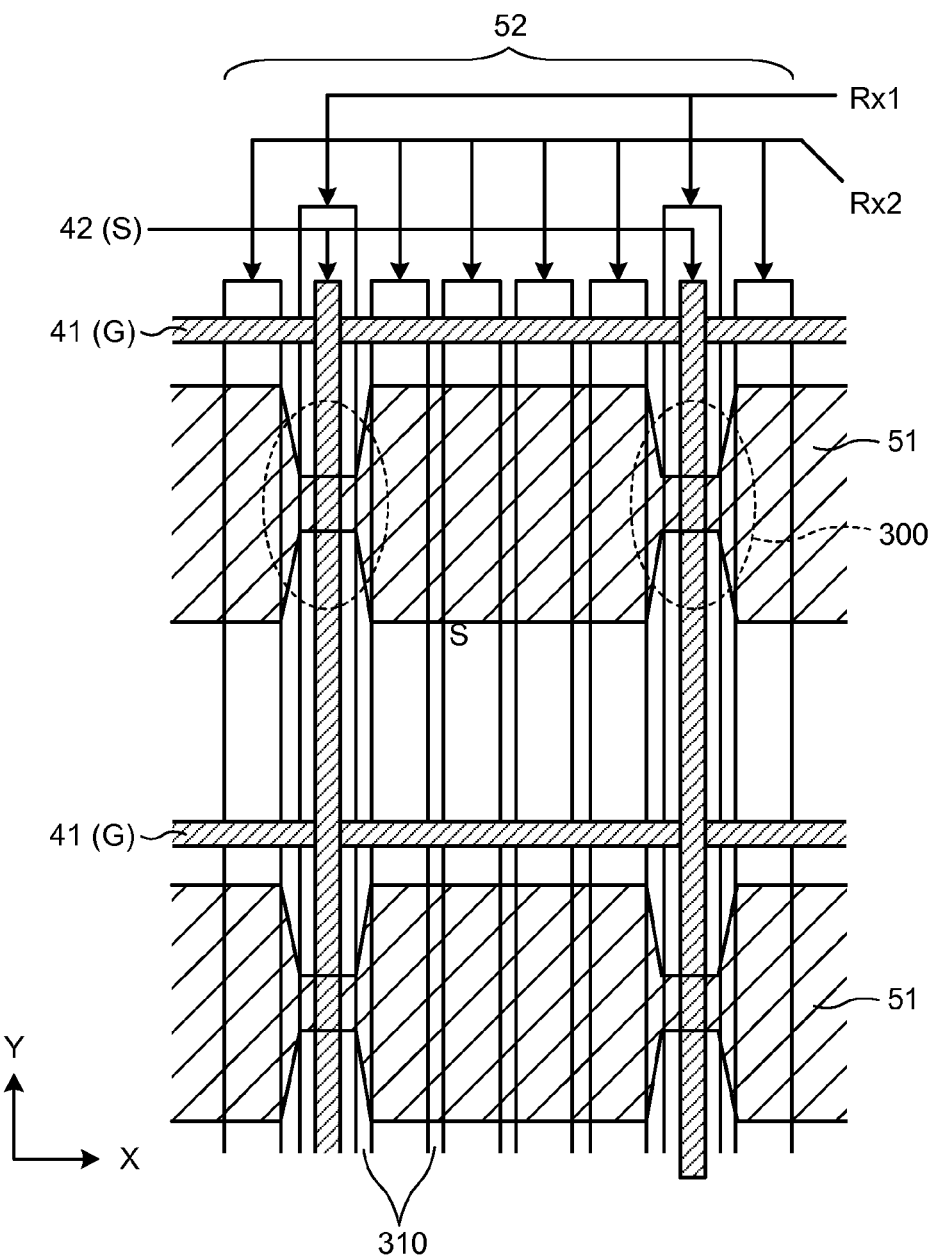
FIG. 11 is a diagram illustrating the planar configuration of wiring pattern and the like of the liquid crystal display device with a touch sensor in the second embodiment.

9). Although they are illustrated to overlap each other in FIG. 10, they are actually formed in separate regions in the same layer (FIG. 11). The positions of the layer of the first electrode 51 and the layer of the second electrode 52 may be vertically shifted in the Z direction. For example, the second electrode 52 (receiving electrode Rx) is positioned at the inner side of the CF substrate 20, more specifically, at the surface adjacent to the liquid crystal layer 30 on the glass substrate 21. However, the second electrode 52 may be positioned at an upper position.

FIG. 11 is an X-Y plane diagram illustrating a pattern configuration example of the first electrode 51 (transmitting electrode Tx), the second electrode 52 (receiving electrode Rx), or the like of the panel section 1 of the liquid crystal display device with a touch sensor in the second embodiment. The first electrode 51 serving as the transmitting electrode Tx and the common electrode COM1 is formed as a pattern parallel to the X direction. The first electrode 51 includes a terminal of the holding capacitor 45 and the holding capacitor line 46.

As illustrated in FIG. 10 and FIG. 11, in the second embodiment, a predetermined pattern different from that in the comparative example (FIG. 8) is formed for the second electrode 52 serving as the receiving electrode Rx and the common electrode COM2 at the inner side of the CF substrate 20. The pattern of the second electrode 52 is separately used as a first pattern part Rx1 and a second pattern part Rx2. The first pattern part Rx1 is the sensor pattern Rx1 used for the touch detection. The second pattern part Rx2 is the floating pattern Rx2 used for load reduction, and it is not used for the touch detection.

The sensor pattern Rx1 is arranged to overlap the source line 42 (source line S) parallel to the Y direction of the array substrate 10 in the X-Y plane view. That is, the sensor pattern Rx1 is also formed as a stripe-shaped pattern parallel to the Y direction. The first electrode 51 (transmitting electrode Tx) and the sensor pattern Rx1 form the capacitor C for the touch sensor function. In this example, because each pixel line (source line S) has a line of the sensor pattern Rx1, the resolution of the touch detection of the touch sensor function and the resolution of the pixel have one-to-one correspondence. The embodiment is not limited to this example, and the arrangement of lines of the sensor pattern Rx1 may be designed according to a required resolution of the touch detection. For example, one sensor pattern Rx1 may be arranged per a plurality of source lines S.

The floating patterns Rx2 are arranged between the sensor patterns Rx1 in the X-Y plane view, and do not overlap the source line 42 (source line S). The floating pattern Rx2 is also formed as a stripe-shaped pattern parallel to the Y direction. As illustrated in FIG. 11, a plurality of lines of the floating pattern Rx2 are arranged in a floating manner (independently) between two lines of the sensor pattern Rx1 corresponding to one pixel line. In FIG. 11, four lines of the floating pattern Rx2 are arranged between two lines of the sensor pattern Rx1 as an example.

With the pattern and the arrangement structure, parasitic capacitance is reduced at the sensor pattern Rx1 of the receiving electrode Rx serving as the common electrode COM2 on the CF substrate 20 and at a portion corresponding to an terminal of the holding capacitor 45 and the holding capacitor line 46 of the first electrode 51 serving as the transmitting electrode Tx and the common electrode COM1 on the array substrate 10. The orientation of the liquid crystal layer 30 in the vertical electric field mode is improved as well.

An end of the line of the sensor pattern Rx1 is fixedly connected to a driver (second electrode driver 202 in FIG. 17 to be described later). On the other hand, the line of the floating pattern Rx2 has basically a floating structure in the panel section 1. That is, the floating pattern Rx2 is separated from the outer side by a selection circuit (Rx2 selection circuit 222 in FIG. 19) to be described later. The use of the floating pattern Rx2 is switched between the liquid crystal display function and the touch sensor function, so that an end of the line of the floating pattern Rx2 is connected to the selection circuit for its driving. When the switch of the selection circuit is turned off, the line of the floating pattern Rx2 is in a floating state (disconnected).

As illustrated in FIG. 11, in accordance with to the configuration of the Rx pattern, each wiring pattern of the first electrode 51, serving as the transmitting electrode Tx and the common electrode COM1 parallel to the X direction on the array substrate 10, is configured not to have a constant width but to have a smaller width (length in the Y direction) at a portion at which it overlaps the source line S and the sensor pattern Rx1 in the Y direction in the X-Y plane view. Thus, the area of an overlapped portion 300 or the like is reduced. Accordingly, the parasitic capacitance (between the sensor pattern Rx1 and the transmitting electrode Tx) is further reduced.

As illustrated in FIG. 11, in a manner corresponding to the separated structure of the receiving electrode Rx pattern, a slit 310 and the like are provided between the line of the sensor pattern Rx1 and the line of the floating pattern Rx2, and between the lines of the floating pattern Rx2. With the slit 310 of the receiving electrode Rx pattern provided, a fringe electric field is generated between the first electrode 51 serving as the transmitting electrode Tx and the common electrode COM1 on the array substrate 10, and the second electrode 52 serving as the receiving electrode Rx and the common electrode COM2 on the CF substrate 20. Accordingly, performance of the liquid crystal display function and the touch sensor function is secured.

Figure 12:
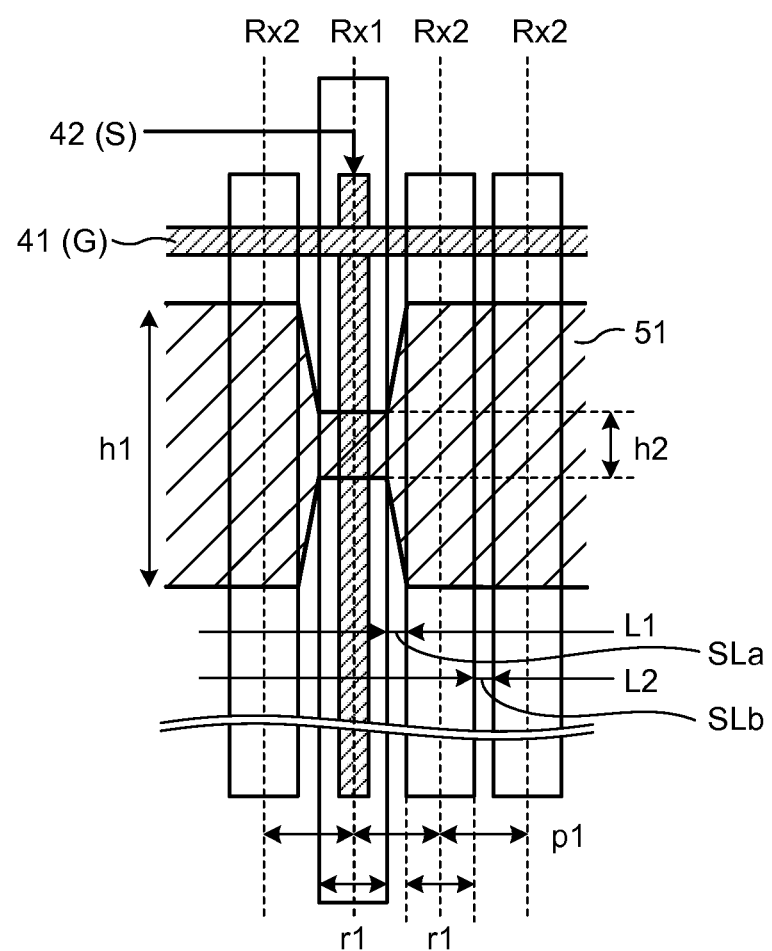
FIG. 12 is a diagram illustrating an enlarged configuration of FIG. 11.

FIG. 12 illustrates a partially enlarged view of FIG. 11. In this configuration example, the lines of the sensor pattern Rx1 and the floating pattern Rx2 are arranged at predetermined pitches p1. The width of the sensor pattern Rx1 and the width of the floating pattern Rx2 are the same width r1.

As the slits, a slit SLa between the lines of the sensor pattern Rx1 and the floating pattern Rx2 and a slit SLb between the lines of Rx2 are illustrated. The width of the slit SLa is a width L1, and the width of the slit SLb is the width L2. In this example, both widths of the slits are the same width. The width of the transmitting electrode Tx is basically a width h1, and may be a narrowed to width h2 at the overlapped portion 300 and the like. That is, the width h2 of the overlapped portion 300 is smaller than the basic width h1 of the transmitting electrode Tx. In other words, the width h2 at the overlapped portion 300 is smaller than the width h1 at a region other than the overlapped portion 300 of the transmitting electrode Tx. Specifically, in this example, the width of the receiving electrode Rx is the width h2 across the width r1 of the sensor pattern Rx1 at the portion where the transmitting electrode Tx and the sensor pattern Rx1 overlap each other.

The embodiment is not limited to the above-described pattern configuration example, and may be designed such that the numbers, shape, size, and the like of electrodes and/or slits vary according to a specific implementation (a desired characteristic). For example, the embodiment has modifications as follows.

3-2. Modifications

Figure 13:
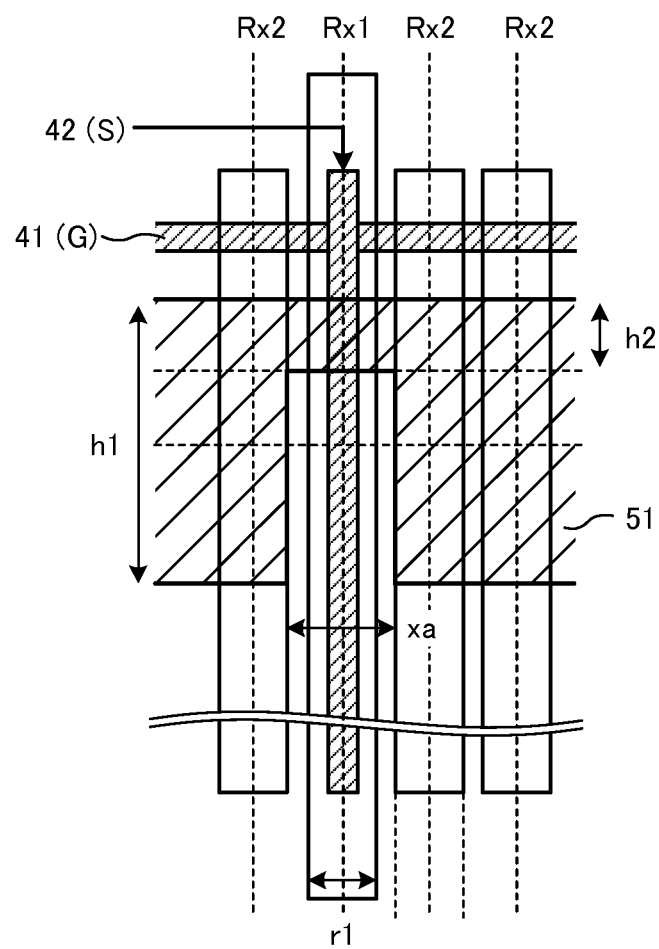
FIG. 13 is a diagram illustrating a first modification of the second embodiment.
Figure 14:
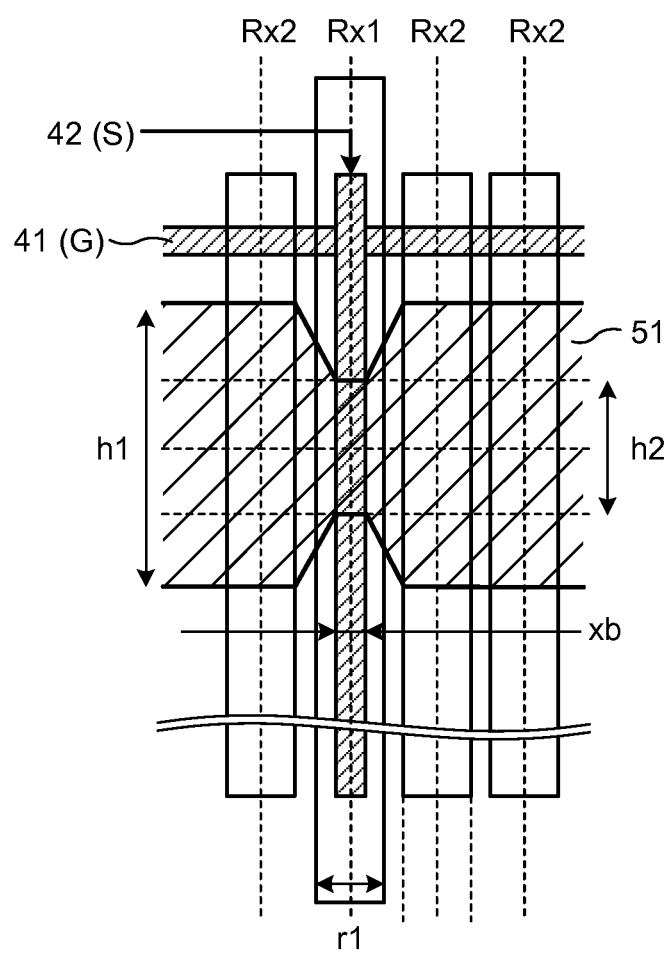
FIG. 14 is a diagram illustrating a second modification of the second embodiment.
Figure 15:
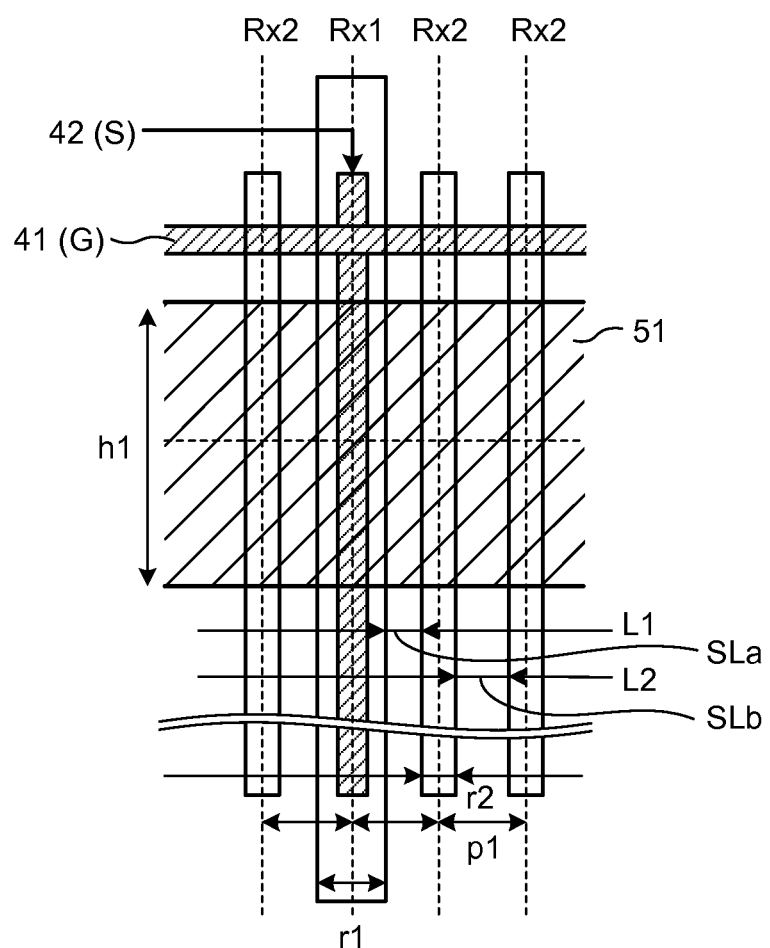
FIG. 15 is a diagram illustrating a third modification of the second embodiment.
Figure 16:
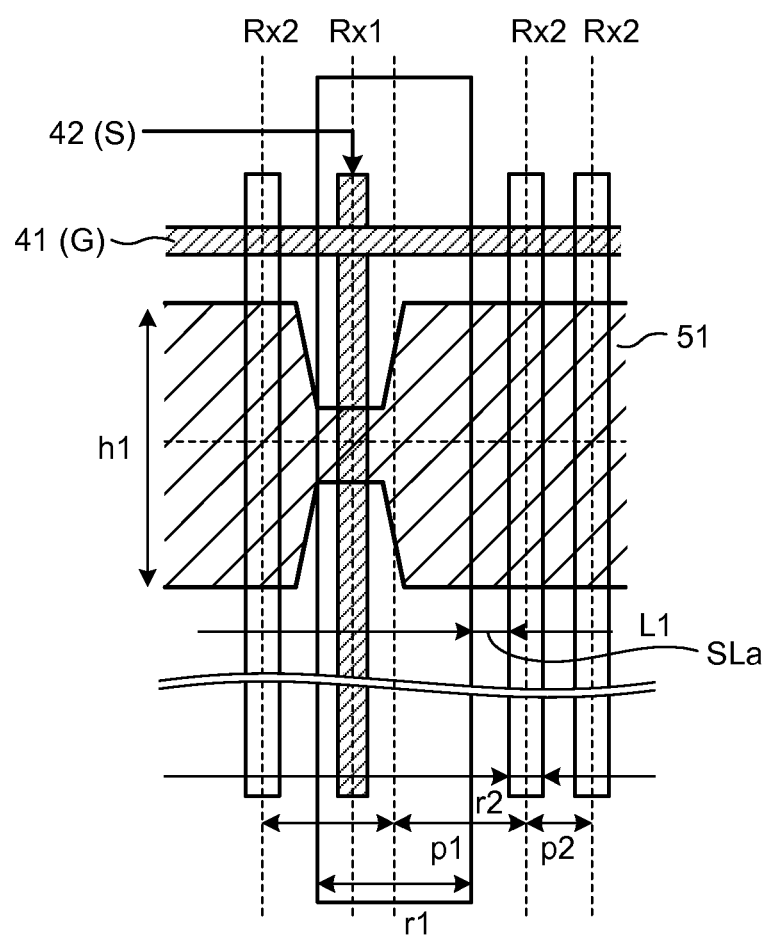
FIG. 16 is a diagram illustrating a fourth modification of the second embodiment.

FIG. 13, FIG. 14, FIG. 15, and FIG. 16 are diagrams illustrating modifications of the configuration in FIG. 12. FIG. 13 is a diagram illustrating a first modification of the second embodiment. FIG. 14 is a diagram illustrating a second modification of the second embodiment. FIG. 15 is a diagram illustrating a third modification of the second embodiment. FIG. 16 is a diagram illustrating a fourth modification of the second embodiment.

In the first modification of the second embodiment illustrated in FIG. 13, the shape of the first electrode 51 serving as the transmitting electrode Tx and the common electrode COM1 is changed, so that the width of the first electrode 51 is changed at the upper part (closer to the gate line 41), not at the center of the holding capacitor line 46, on the portion overlapping the sensor pattern Rx1. Similarly, the width of the transmitting electrode Tx may be changed to the width h2, which is a narrowed width, at the lower part. At the portion where the transmitting electrode Tx and the sensor pattern Rx1 overlap, the length in the X direction of a portion with the width h2, which is a narrowed width of the transmitting electrode Tx, is longer than the width r1 of the sensor pattern Rx1 and is the same as the length xa between the floating patterns Rx2 adjacent to the sensor pattern Rx1 (xa>r1).

In the second modification of the second embodiment illustrated in FIG. 14, the shape of the first electrode 51 serving as the transmitting electrode Tx and the common electrode COM1 is changed, so that the width h2, which is a narrowed width of the transmitting electrode Tx, is made larger and the length in the X direction of a portion with the width h2, which is the narrowed width of the transmitting electrode Tx, is made smaller than the width r1 of the sensor pattern Rx1 and is the same with the width xb of the source line S (xb<r1) at the portion where the transmitting electrode Tx and the sensor pattern Rx1 overlap.

In the third modification of the second embodiment illustrated in FIG. 15, the first electrode 51 serving as the transmitting electrode Tx and the common electrode COM1 has a constant width of the width h1. The width r2 of the floating pattern Rx2 is smaller than the width r1 of the sensor pattern Rx1 (r1>r2). The width L2 of a slit SLb between the floating patterns Rx2 is larger than the width L1 of a slit SLa between the sensor pattern Rx1 and the floating pattern Rx2 (L1<L2). The configuration opposite from the above may be employed (r1<r2, L1>L2).

In the fourth modification of the second embodiment illustrated in FIG. 16, the shape of the transmitting electrode Tx is similar to the above (FIG. 12). The width r1 of the sensor pattern Rx1 is made larger and the center line of the sensor pattern Rx1 is shifted to the right relative to the center line of the source line S, for example. That is, in the X-Y plane view, the sensor pattern Rx1 partially overlaps the source line S and projects to the right relative to the source line S, so that it further overlaps the transmitting electrode Tx as much as the projection. To reduce the capacitance due to the overlapping of the sensor pattern Rx1 and the transmitting electrode Tx, the width of the Tx at the overlapped portion may be narrowed.

4. Third Embodiment

Next, a third embodiment will be described with reference to FIG. 17 to FIG. 19. The third embodiment describes a configuration example of a liquid crystal touch panel module 100 including the panel section 1 of the liquid crystal display device with a touch sensor and a driver IC thereof or the like, and a configuration example of an electronic apparatus 500 including the liquid crystal touch panel module 100. Specifically, a drive system with respect to the floating pattern Rx2 in the second embodiment will be described as well.

4-1. Liquid Crystal Touch Panel Module, and Electronic Apparatus

Figure 17:
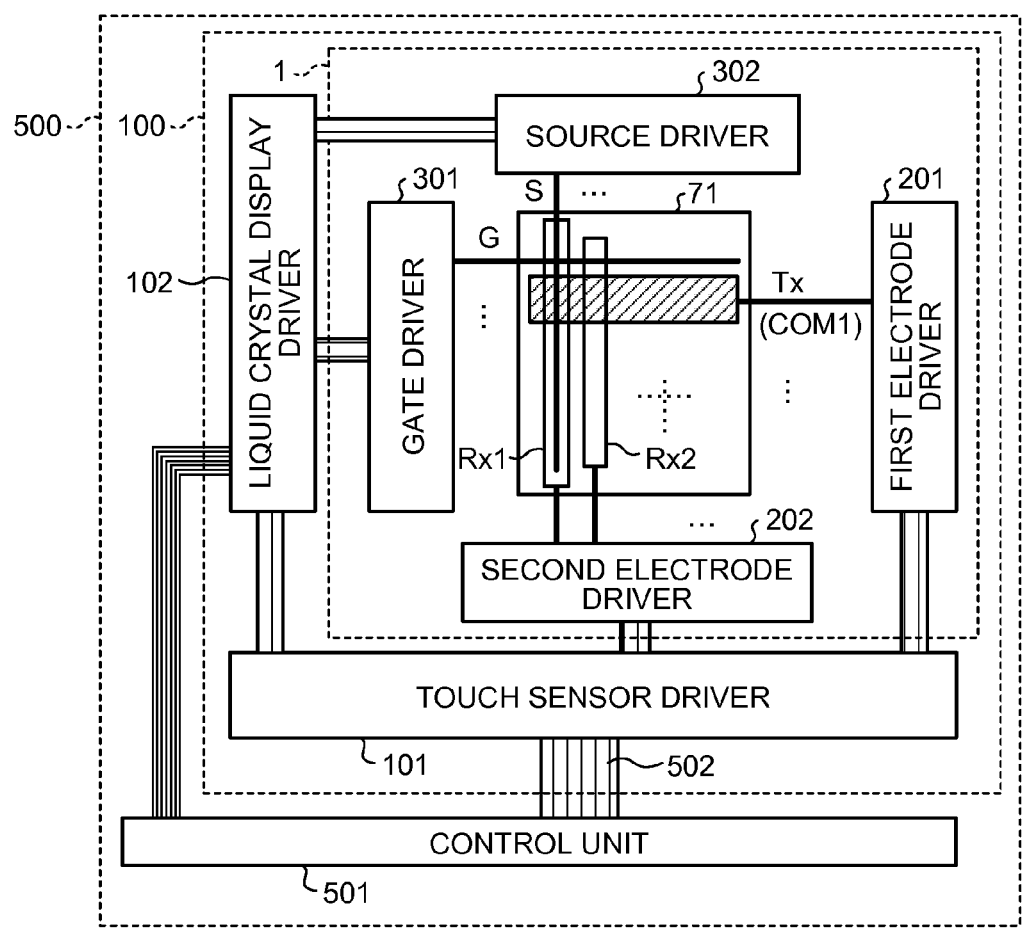
FIG. 17 is a diagram illustrating a functional block configuration of a liquid crystal touch panel module and an electronic apparatus of a third embodiment.

FIG. 17 illustrates a functional block configuration example of the electronic apparatus 500 including the liquid crystal touch panel module 100 (liquid crystal display device with an in-cell capacitive touch sensor) in the third embodiment. Examples of the electronic apparatus 500 may include various devices having the liquid crystal display function and the touch sensor function such as a mobile terminal, a TV set, and a digital camera. The electronic apparatus 500 includes the liquid crystal touch panel module 100 and a control unit 501 for connecting the same.

The liquid crystal touch panel module 100 includes the panel section 1 of the liquid crystal display device with a touch sensor, and a touch sensor driver 101 (a first controller) and a liquid crystal display driver 102 (a second controller) both connected to the panel section 1. The liquid crystal touch panel module 100 and the control unit 501 are connected via an interface (I/F) 502 of the touch sensor driver 101. The interface 502 includes the interface of a power supply and the interface of a touch sensor. The liquid crystal display driver 102 and the control unit 501 are connected. The touch sensor driver 101 and the liquid crystal display driver 102 are synchronized. In this configuration example, although the touch sensor driver 101 (first controller) is a main control unit (superior to the liquid crystal display driver 102) of the liquid crystal touch panel module 100 (the panel section 1 of the liquid crystal display device with a touch sensor), the relationship between the drivers may be reversed or the drivers may be integrated. For example, each of the touch sensor driver 101 and the liquid crystal display driver 102 is implemented as an IC on an FPC substrate connected to the panel section 1. For example, each driver is implemented using a chip on film (COF) method and the like.

The panel section 1 of the liquid crystal display device with a touch sensor is configured as described above (for example, FIG. 9), and includes a display area 71 including a pixel and a touch detection region (unit U), a frame part (not illustrated) on the outer side thereof, and drivers each connected to electrodes or wirings (the gate lines G, the source lines S, the transmitting electrodes Tx, and the receiving electrodes Rx) and the like in the display area 71. Examples of the drivers include a gate driver 301, a source driver 302, a first electrode driver 201 serving as the transmitting electrode Tx and the common electrode COM1, and a second electrode driver 202 serving as the receiving electrode Rx and the common electrode COM2. Each of the drivers is implemented, for example, on the frame part on the outer side of the display area 71, the lower glass substrate 11 or the upper glass substrate 21. Each driver is implemented using, for example, a chip on glass (COG) method, a low-temperature poly (polycrystalline) silicon (LTPS) method, and the like.

The drivers may be separated or integrated as appropriate. For example, the gate driver 301 and the first electrode driver 201 may be integrated, or the source driver 302 and the second electrode driver 202 may be integrated. The first electrode driver 201 or the second electrode driver 202 may be integrated with the touch sensor driver 101, and the gate driver 301 or the source driver 302 may be integrated with the liquid crystal display driver 102.

The touch sensor driver 101 receives a video signal and the like from the control unit 501 of the electronic apparatus 500, and performs timing control for the liquid crystal display driver 102 and touch detection control for the panel section 1 of the liquid crystal display device with a touch sensor. For example, the touch sensor driver 101 gives the liquid crystal display driver 102 control signals such as video signals and timing signals. For example, the touch sensor driver 101 gives the first electrode driver 201 and the second electrode driver 202 a control signal for the touch detection control. Then, the touch sensor driver 101 transmits information about a control result of each function (for example, information about the presence or absence of touching, and a touch position) to the control unit 501.

On the basis of a control signal from the control unit 501 or a control signal from the touch sensor driver 101, the liquid crystal display driver 102 gives the gate driver 301 and the source driver 302 a signal for display control at the display area 71 in the panel section 1 of the liquid crystal display device with a touch sensor. A video signal may be given from the control unit 501 to the liquid crystal display driver 102. The gate driver 301 sequentially applies a gate signal (scanning pulse) to a group of the gate lines 41 (gate lines G). Synchronically, the source driver 302 applies a source signal (pixel signal) to a group of the source lines 42 (source lines S). Accordingly, the pixel signal is applied to each pixel capacitor 43 via the TFT 44 and the holding capacitor 45 is charged. Thus, the state of the liquid crystal layer 30 is controlled (modulated) for each pixel.

According to the control signal from the touch sensor driver 101, the first electrode driver 201 supplies the common voltage Vcom for the common electrode COM1 and sequentially applies a signal s1 serving as the touch driving signal for the transmitting electrode Tx, to the first electrode 51 serving as the transmitting electrode Tx and the common electrode COM1 in the panel section 1 of the liquid crystal display device with a touch sensor.

On the basis of the control signal from the touch sensor driver 101, the second electrode driver 202 supplies the common voltage Vcom for the common electrode COM2, and inputs and detects a signal s2 that is the touch detection signal for the receiving electrode Rx (sensor pattern Rx1), with respect to the second electrode 52 serving as the receiving electrode Rx and the common electrode COM2 in the panel section 1 of the liquid crystal display device with a touch sensor. A signal of a detection result that is the signal s2, which is the touch detection signal, detected by the second electrode driver 202 is output to the touch sensor driver 101. In the second electrode driver 202, the signal s2 that is the touch detection signal from the receiving electrode Rx (specifically, the sensor pattern Rx1) is input and integrated, and converted to a digital signal. On the basis of these process, the presence or absence of touching in the display area 71 (touch detection region) is determined and the coordinates of a touch position is calculated, so that a signal indicating a result thereof is output. A touch detection circuit included in the second electrode driver 202 includes, for example, an amplifier, a filter, an A/D converter, a rectifier smoothing circuit, and a comparator. An input level signal that is the signal s2 from the receiving electrode Rx is compared with the threshold voltage Vth by the comparator as described above (FIG. 3), and as a result, a signal indicating the presence or absence of touching is output.

4-2. Driving Waveforms

FIG. 18 illustrates a timing chart of driving waveforms each for a drive system of the panel section 1 of the liquid crystal display device with a touch sensor. The chart corresponds to the driver configuration in FIG. 17 and each driver generates a driving waveform. In the present drive system, one horizontal period (1H) is divided into a pixel writing period PW in which the liquid crystal display function is activated and a touch sensing period TS in which the touch sensor function is activated, and the liquid crystal display function and the touch sensor function are driven in a time division manner. With respect to the shared electrode sections (the first electrode 51 and the second electrode 52), a signal (voltage) corresponding to each function is applied thereto in a time division manner. As the liquid crystal display drive system, for example, a dot inversion drive system or a frame inversion drive system is used.

The drive frequency of each of the pixel writing period PW and the touch sensing period TS may be designed as appropriate. For example, the drive frequency of the pixel writing period PW is set to 60 Hz, and in contrast, that of the touch sensing period TS is set to twice, that is, 120 Hz. That is, in this case, the touch detection is performed two times for each one image (pixel) display. The order of the pixel writing period PW and the touch sensing period TS in 1 H may be reversed.

An HSYNC signal in FIG. 18(a) defines one horizontal period (1 H). A G signal in FIG. 18(b) is applied from the gate driver 301 to the gate line 41 (gate line G). An S signal (image signal) in FIG. 18(c) is applied from the source driver 302 to the source line 42 (source line S). The reference Tx (COM1) in FIG. 18(c) indicates a signal applied from the first electrode driver 201 to the first electrode 51. The reference Rx1 (COM2) in FIG. 18(e) indicates a signal applied from the second electrode driver 202 to the sensor pattern Rx1 of the second electrode 52. The reference Rx2 (COM2) in FIG. 18(f) indicates a signal applied from the second electrode driver 202 to the floating pattern Rx2 of the second electrode 52. A selection signal Q in FIG. 18(g) indicates a selection signal of the floating pattern Rx2. The selection signal Q is generated by the Rx2 selection circuit 222 illustrated in FIG. 19. The selection signal Q is controlled to be turned on in the pixel writing period PW and to be turned off in the touch sensing period TS.

In the pixel writing period PW, the common voltage Vcom (common driving signal) is supplied from the first electrode driver 201 to the first electrode 51 (common electrode COM1), and the common voltage Vcom (common driving signal) is supplied from the second electrode driver 202 to the second electrode 52 (the receiving electrode Rx (the sensor pattern Rx1 and the floating pattern Rx2)). Accordingly, the first electrode 51 (common electrode COM1) and the second electrode 52 (common electrode COM2) as a whole are controlled to have common electric potential (Vcom).

In the touch sensing period TS, the signal s1 as the touch driving signal is sequentially applied from the first electrode driver 201 to the first electrode 51 (receiving electrode Rx), so that the first electrode 51 functions as the transmitting electrode Tx and the sensor pattern Rx1 of the second electrode 52 functions as the receiving electrode Rx. The second electrode driver 202 (specifically, Rx1 detection circuit 221 in FIG. 19) detects the signal s2 that is the touch detection signal from the sensor pattern Rx1.

In the pixel writing period PW, the floating pattern Rx2 is turned on through the selection signal Q, and thereby connected to be applied with the common voltage Vcom. Thus, the floating pattern Rx2 functions as the common electrode COM2. In the touch sensing period TS, the floating pattern Rx2 is turned off through the selection signal Q, and thereby disconnected to be in a floating state. Thus, the floating pattern Rx2 does not function as the receiving electrode Rx.

The common driving signal (common voltage Vcom) defines a display voltage of each pixel along with a pixel voltage applied to the pixel capacitor 43, serving as the liquid crystal display function, and defines the signal s1 as the touch driving signal for the transmitting electrode Tx (touch drive electrode E1), serving as the touch sensor function. FIG. 18 only illustrates a single pulse as a driving waveform in the touch sensing period TS, and an alternating current square wave may be applied.

4-3. Example of Driver Configuration (1)

Figure 19:
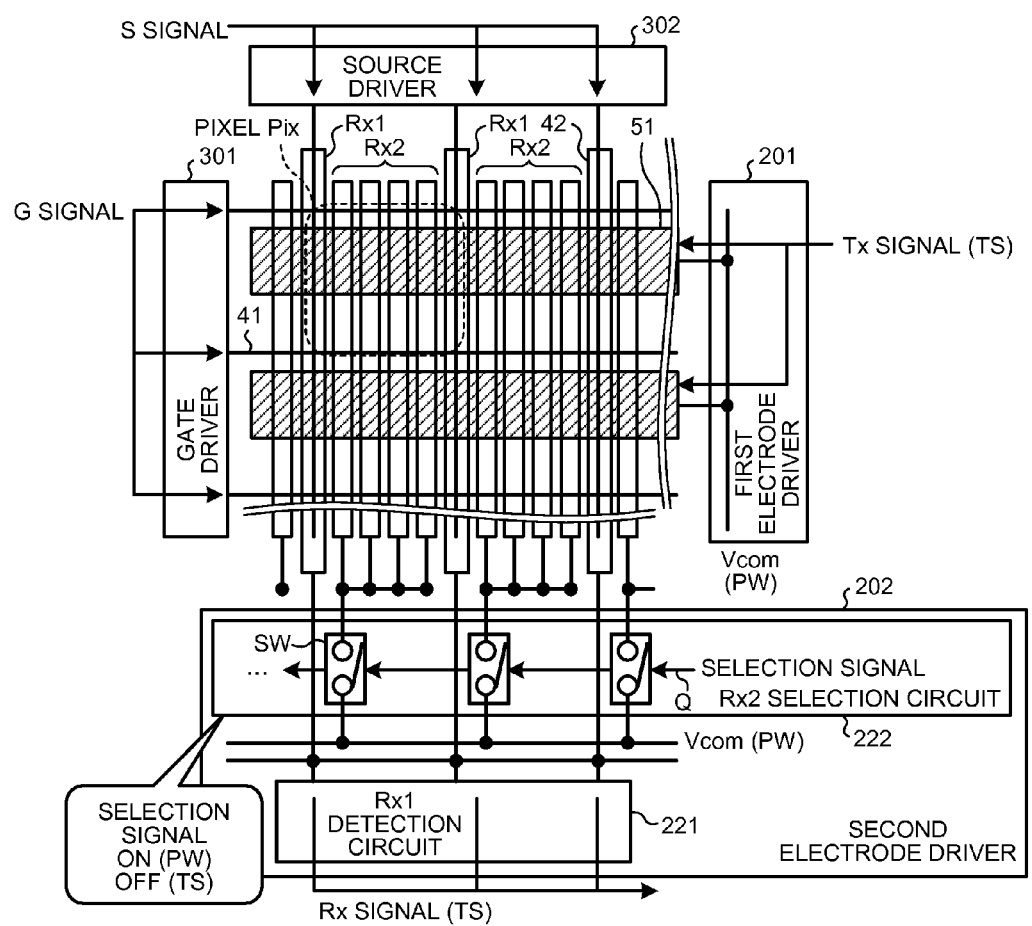
FIG. 19 is a diagram illustrating a configuration example of a driver of the liquid crystal touch panel module of the third embodiment.

FIG. 19 illustrates a configuration example of connection between the drivers and the electrodes and wiring (wiring pattern of the gate line G, the source line S, the transmitting electrode Tx, the receiving electrode Rx, and the like) in the panel section 1 of the liquid crystal display device with a touch sensor corresponding to the configurations in FIG. 17 and FIG. 18. In the display area 71 of the panel section 1 of the liquid crystal display device with a touch sensor, provided are the gate line 41 (gate line G) parallel to the X direction, the first electrode 51 serving as the transmitting electrode Tx and the common electrode COM1 and also as a stripe-shaped pattern parallel to the X direction, the source line 42 (source line S) parallel to the Y direction orthogonal to the X direction, and the second electrode 52 serving as the receiving electrode Rx and the common electrode COM2 and also as a stripe-shaped pattern parallel to the Y direction. These electrodes and wiring (the gate line G, the source line S, the transmitting electrode Tx, the receiving electrode Rx, and the like) are connected to respective drivers as illustrated in the drawings.

In the configuration example of FIG. 19, the second electrode driver 202 includes the Rx1 detection circuit 221 and the Rx2 selection circuit 222. In the touch sensing period TS, the Rx1 detection circuit 221 inputs and processes the signal s2 as the touch detection signal from each line of the sensor pattern Rx1, and outputs a resultant Rx signal. The Rx2 selection circuit 222 includes a plurality of switches SW, and each line of the floating pattern Rx2 is connected to each of the switches SW. In the configuration example of FIG. 19, a plurality of lines of the floating patterns Rx2 per pixel line are connected to one common switch SW. For example, in FIG. 19, four lines of the floating pattern Rx2 per pixel line are connected to one common switch SW. One end of the switch SW is connected to an end of the line of the floating pattern Rx2, whereas the other end is connected to the common voltage Vcom. The selection signal Q of the floating pattern Rx2 is input to a control terminal. On the basis of a control of the upper section, a switching control is performed so that the selection signal Q is turned on in the pixel writing period PW and the selection signal Q is turned off in the touch sensing period TS. Accordingly, the state (function) of the floating pattern Rx2 is controlled as described above (FIG. 18).

The Rx2 selection circuit 222 may be arranged outside from the second electrode driver 202 separately. For example, the Rx2 selection circuit 222 may be mounted on the frame part. The transmitting electrode Tx (touch drive electrode E1) and the receiving electrode Rx (touch detection electrode E2) may be configured as blocks (an E1 block and an E2 block) commonly connected per a plurality of pixel lines as described above (FIG. 4). In this case, an intersecting region of those blocks is the touch detection unit U.

4-4. Example of Driver Configuration (2)

Figure 20:
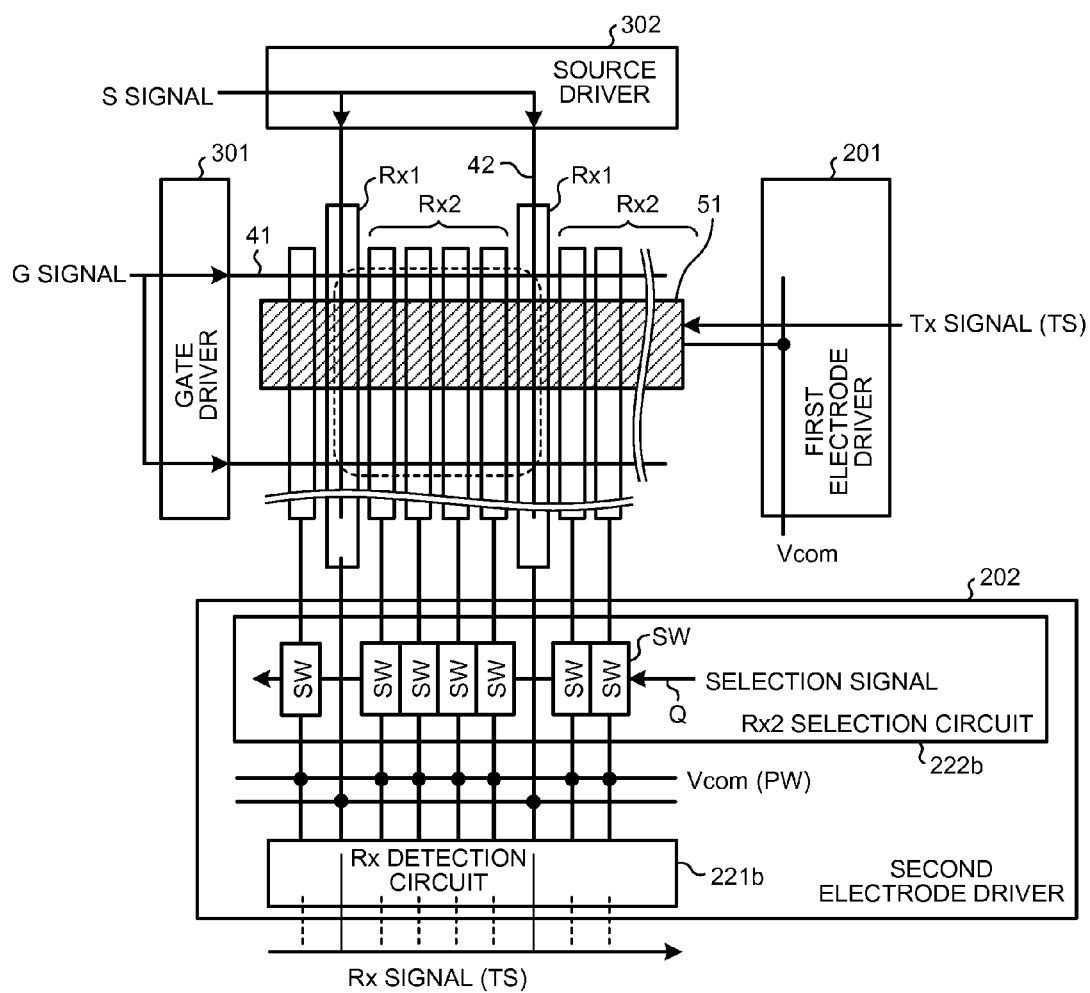
FIG. 20 is a diagram illustrating a first modification of the configuration example of the driver of the liquid crystal touch panel module of the third embodiment.

FIG. 20 is a diagram illustrating a first modification of the example of the driver configuration of the liquid crystal touch panel module in the third embodiment. FIG. 20 illustrates a modification of the configuration in FIG. 19. In the configuration of FIG. 20, each of the floating patterns Rx2 in the panel section 1 of the liquid crystal display device with a touch sensor is independently connected to the switch SW of an Rx2 selection circuit 222b, and independently connected to an Rx detection circuit 221b. In the second electrode driver 202, each of the switches SW is controlled to be on and off through the selection signal Q of the Rx2 selection circuit 222b, so that each floating pattern Rx2 may be independently turned on and off. The selection signal Q turns the switches SW on in the pixel writing period PW, and turns on the switch SW corresponding to a selected floating pattern Rx2 and off the switches SW corresponding to the others (non-selected floating pattern Rx2) in the touch sensing period TS. That is, the second electrode driver 202 can select the line of a desired floating pattern Rx2 in the panel section 1 (display area 71) of the liquid crystal display device with a touch sensor to detect an Rx signal.

5. Advantageous Effects

As described above, according to the embodiments, the panel section 1 of the liquid crystal display device with an in-cell capacitive touch sensor has a configuration in which electrode layers are simplified, especially of a sharing type in the vertical electric field mode. This enables reducing a step for processing a sensor pattern (receiving electrode Rx) layer on the front surface of the CF substrate 20 in the manufacturing process, in other words, manufacturing the panel section 1 by the simplified manufacturing process. Accordingly, cost reduction and the like may be achieved while maintaining thinness and high performance.

Hereinabove, the disclosure devised by the inventor has been described in detail on the basis of the embodiments. However, the invention is not limited to the above embodiments and may be variously modified without departing from the spirits of the disclosure. The embodiments may be used for various electronic apparatuses, such as mobile apparatuses and the like.

6. Application Example

Next, application examples of the panel section 1 of the liquid crystal display device with a touch sensor described in the embodiments will be described with reference to FIG. 21 to FIG. 28. FIG. 21 to FIG. 28 each illustrate an example of the electronic apparatus to which the liquid crystal display device according to the embodiments is applied. The panel section 1 of the liquid crystal display device with a touch sensor according to the embodiments may be applied to electronic apparatuses in every field including, but not limited to, a portable terminal device such as a mobile phone and a smartphone, a television apparatus, a digital camera, a portable personal computer, a video camera, a meter provided on a vehicle, etc. In other words, the panel section 1 of the liquid crystal display device with a touch sensor according to the embodiments may be applied to electronic apparatuses in every field that display a video signal input from the outside or a video signal generated in the inside as an image or a video. The electronic apparatuses includes a control device that supplies a video signal to the panel section 1 of the liquid crystal display device with a touch sensor and controls the operation of the panel section 1 of the liquid crystal display device with a touch sensor. The embodiments may be used for various electronic apparatuses such as on-vehicle equipment and the like. For example, the panel section 1 of the liquid crystal display device with a touch sensor may be part of a meter unit which is attached to an on-vehicle exterior panel to serve as a fuel meter, a water temperature meter, a speedometer, a tachometer, and the like.

6-1. Application Example 1

Figure 21:
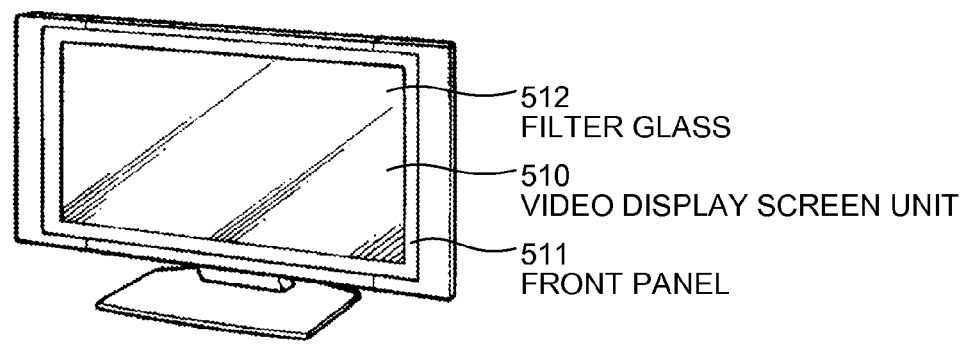
FIG. 21 is a diagram illustrating an example of an electronic apparatus to which the liquid crystal display device according to the present embodiment is applied.

An electronic apparatus illustrated in FIG. 21 is a television apparatus to which the panel section 1 of the liquid crystal display device with a touch sensor according to the embodiments is applied. For example, the television apparatus has a video display screen unit 510 including a front panel 511 and a filter glass 512, and the video display screen unit 510 is the panel section 1 of the liquid crystal display device with a touch sensor according to the embodiments.

6-2. Application Example 2

Figure 22:
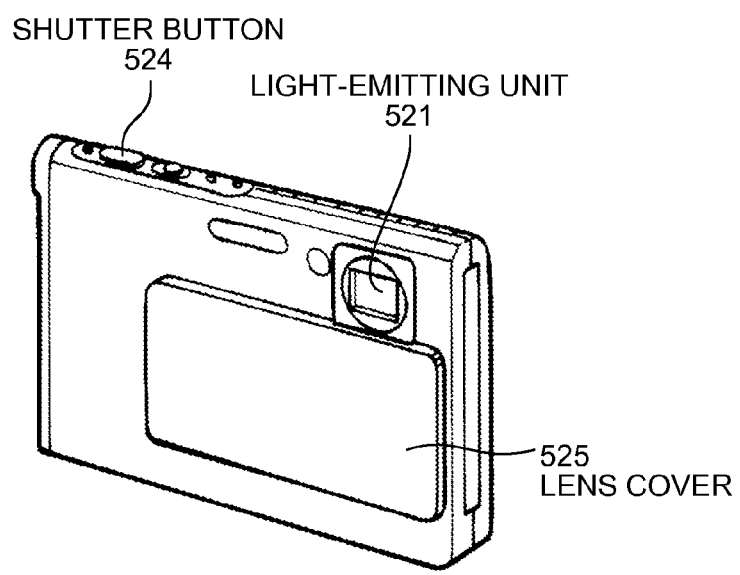
FIG. 22 is a diagram illustrating an example of an electronic apparatus to which the liquid crystal display device according to the embodiment is applied.
Figure 23:
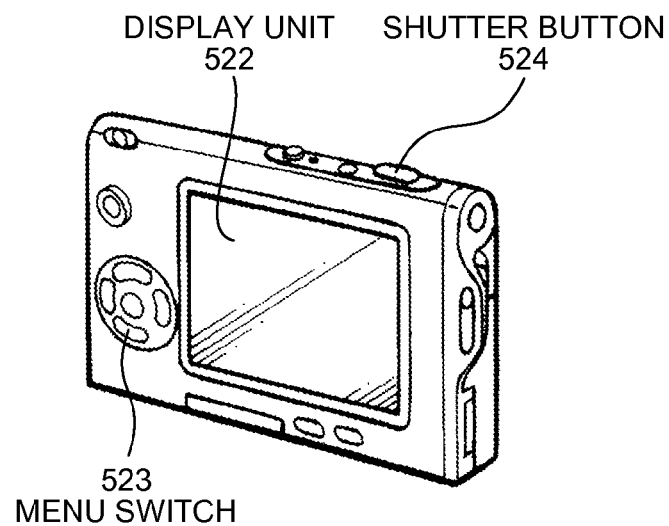
FIG. 23 is a diagram illustrating an example of an electronic apparatus to which the liquid crystal display device according to the embodiment is applied.

An electronic apparatus illustrated in FIG. 22 and FIG. 23 is a digital camera to which the panel section 1 of the liquid crystal display device with a touch sensor according to the embodiments is applied. For example, this digital camera includes a light-emitting unit 521 for flash, a display unit 522, a menu switch 523, and a shutter button 524. The display unit 522 is the panel section 1 of the liquid crystal display device with a touch sensor according to the embodiments. As illustrated in FIG. 22, this digital camera has a lens cover 525, and a taking lens is exposed by sliding the lens cover 525. The digital camera can take a digital photo by imaging incident light through the taking lens.

6-3. Application Example 3

Figure 24:
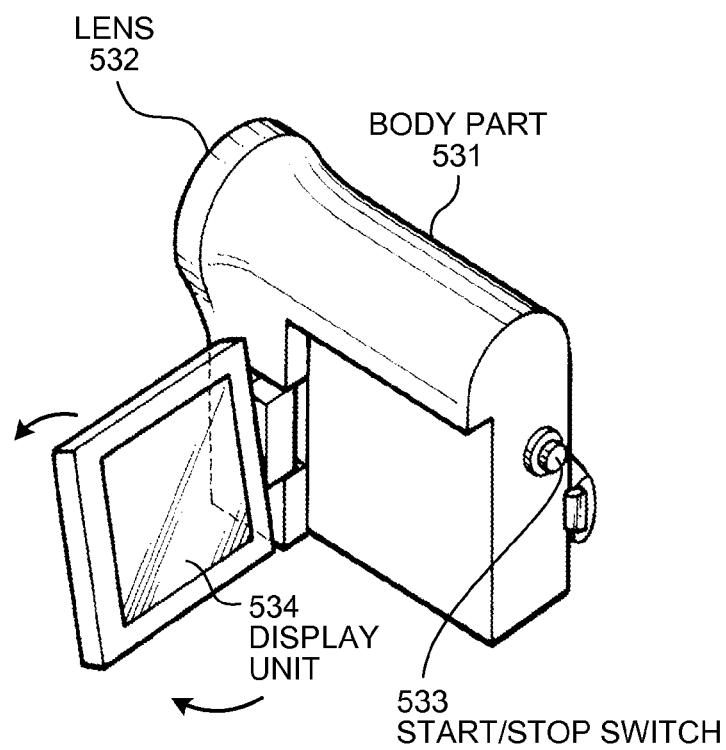
FIG. 24 is a diagram illustrating an example of an electronic apparatus to which the liquid crystal display device according to the embodiment is applied.

An electronic apparatus illustrated in FIG. 24 represents an external appearance of a video camera to which the panel section 1 of the liquid crystal display device with a touch sensor according to the embodiments is applied. For example, this video camera includes a body part 531, a lens 532 for photographing a subject provided on a front side surface of the body part 531, a start/stop switch 533 used at the time of photographing, and a display part 534. The display unit 534 is the panel section 1 of the liquid crystal display device with a touch sensor according to the embodiments.

6-4. Application Example 4

Figure 25:
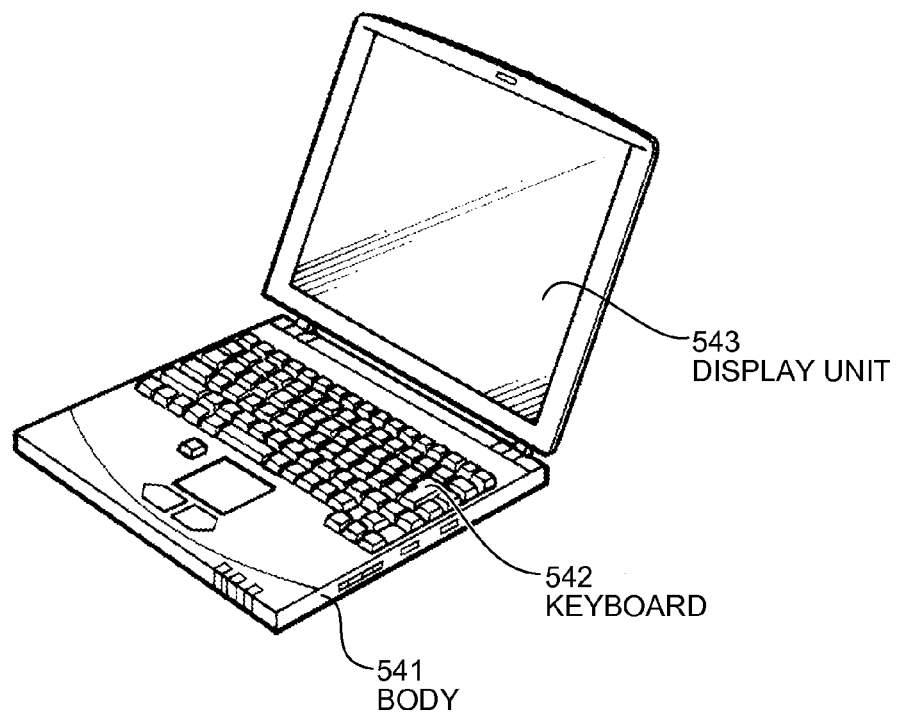
FIG. 25 is a diagram illustrating an example of an electronic apparatus to which the liquid crystal display device according to the embodiment is applied.

An electronic apparatus illustrated in FIG. 25 is a portable personal computer to which the panel section 1 of the liquid crystal display device with a touch sensor according to the embodiments is applied. For example, the laptop personal computer has a body 541, a keyboard 542 for inputting characters and the like, and a display unit 543 for displaying an image. The display unit 543 is configured by the panel section 1 of the liquid crystal display device with a touch sensor according to the embodiments.

6-5. Application Example 5

Figure 26:
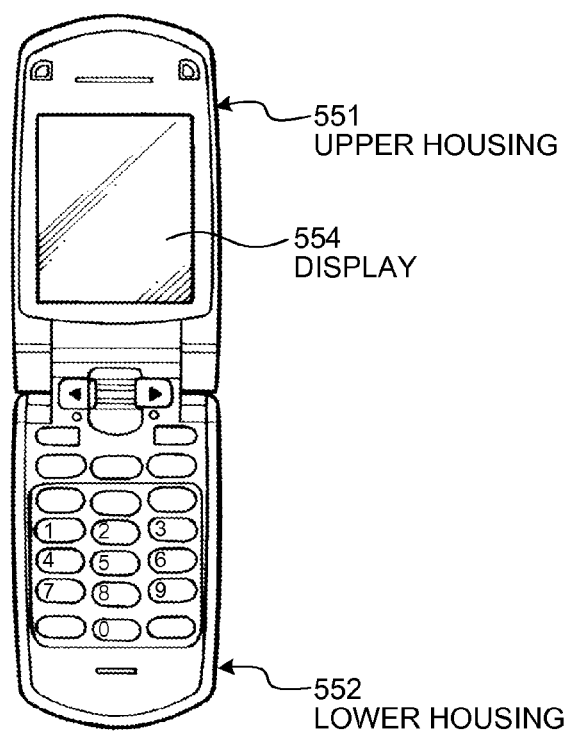
FIG. 26 is a diagram illustrating an example of an electronic apparatus to which the liquid crystal display device according to the embodiment is applied.
Figure 27:
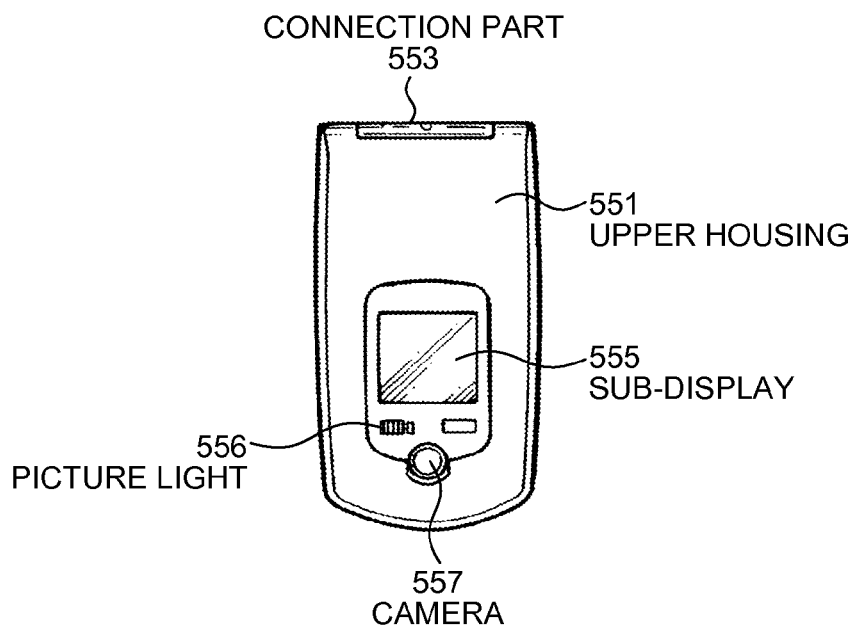
FIG. 27 is a diagram illustrating an example of the electronic apparatus to which the liquid crystal display device according to the embodiment is applied.

An electronic apparatus illustrated in FIG. 26 and FIG. 27 is a mobile phone to which the panel section 1 of the liquid crystal display device with a touch sensor is applied. FIG. 26 is a front view of the mobile phone in an open state. FIG. 27 is a front view of the mobile phone in a folded state. For example, the mobile phone is configured by connecting an upper housing 551 and a lower housing 552 via a connection part (hinge part) 553, and includes a display 554, a sub-display 555, a picture light 556, and a camera 557. The panel section 1 of the liquid crystal display device with a touch sensor is attached to the display 554. Accordingly, the display 554 of the mobile phone may have a function for detecting a touch operation in addition to a function for displaying an image.

6-6. Application Example 6

Figure 28:
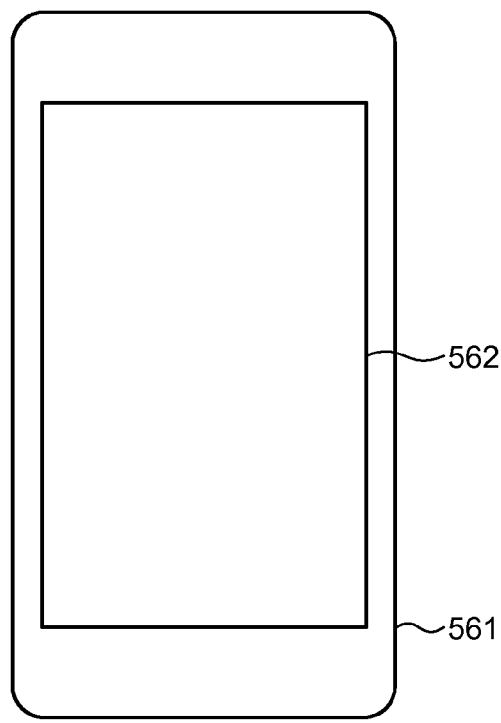
FIG. 28 is a diagram illustrating an example of an electronic apparatus to which the liquid crystal display device according to the embodiment is applied.

An electronic apparatus illustrated in FIG. 28 is a mobile information device operating as a portable computer, a multi-functional mobile phone, a portable computer that can perform voice call, or a communicatable portable computer. The device may be called a smartphone or a tablet device. This mobile information device has a display unit 562 on a surface of a housing 561, for example. The display unit 562 is the panel section 1 of the liquid crystal display device with a touch sensor according to the embodiments.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A liquid crystal display device with a touch sensor having a liquid crystal display function and a touch sensor function, the liquid crystal device comprising:
   a first substrate including a pixel electrode and a first electrode;
   a second substrate including a second electrode; and
   a liquid crystal layer provided between the first substrate and the second substrate, wherein
   upon the liquid crystal display function being activated, the pixel electrode is supplied with a pixel signal, and the first and second electrodes are supplied with common voltage, and
   upon the touch sensor function being activated, the first electrode is applied with a first signal and the second electrode is configured to receive the first signal to be a second signal as a touch detecting signal;
   the first electrode includes patterns of electrodes along a first direction, each of the patterns being configured to form a holding capacitor,
   the second electrode includes patterns of electrodes along a second direction on the second substrate,
   the patterns of the first electrode on the first substrate face the patterns of second electrode on the second substrate, and
   the patterns of first electrode cross the patterns of second electrode in a planar view.

2. The liquid crystal display device with a touch sensor according to claim 1, wherein
   the patterns of the second electrode includes
   a first pattern configured to be used as a sensor pattern through which the second signal is detected upon the touch sensor function being activated and
   a second pattern configured to be separated from the outside upon the touch sensor function being activated, and the first pattern and the second pattern have therebetween a slit to generate a fringe electric field.

3. The liquid crystal display device with a touch sensor according to claim 2, wherein
the first substrate includes a source line that is connected to the pixel electrode, and
the first pattern is arranged to overlap the source line in a planar view.

4. The liquid crystal display device with a touch sensor according to claim 2, further comprising a selection circuit including a switch configured to switch a connection state between the second pattern and the selection circuit to ON or OFF, wherein
the second pattern is supplied with the common voltage when the connection state is turned ON.

5. The liquid crystal display device with a touch sensor according to claim 2, wherein
the first pattern has a portion overlapping the second pattern in a plane view, a width of the portion being smaller than that of the other portion.

6. The liquid crystal display device with a touch sensor according to claim 2, further comprising
a first electrode driver connected to the first electrode; and
a second electrode driver including
a detection circuit connected to the first pattern of the second electrode; and
a selection circuit connected to the second pattern of the second electrode, wherein
the detection circuit is configured to calculate presence or absence of touching and/or a position of the touching based on the second signal from of the first pattern and output a resultant signal, and
the selection circuit includes a switch connected to the second pattern and is configured to
turn on the switch to supply the common voltage to the first electrode in a pixel writing period of a horizontal period and
turn off the switch in a touch sensing period of the horizontal period.

7. The liquid crystal display device with a touch sensor according to claim 1, further comprising
a first electrode driver connected to the first electrode; and
a second electrode driver connected to the second electrode, wherein
the first electrode driver is configured to
supply the common voltage to the first electrode in a pixel writing period of a horizontal period and
apply the first signal to the first electrode in a touch sensing period of the horizontal period, and the second electrode driver is configured to
supply the common voltage to the second electrode in the pixel writing period of the horizontal period and
detect the second signal through the second electrode in the touch sensing period of the horizontal period.

8. The liquid crystal display device with a touch sensor according to claim 7, further comprising:
a gate line on the first substrate;
a source line on the first substrate;
a color filter on the second substrate;
a gate driver connected to the gate line;
a source driver connected to the source line;
a first controller that is connected to the first electrode driver and the second electrode driver and that is configured to perform driving control of the touch sensor function; and
a second controller that is connected to the gate driver and the source driver and is configured to perform driving control of the liquid crystal display function.

9. An electronic apparatus including a liquid crystal display device with a touch sensor having a liquid crystal display function and a touch sensor function, the liquid crystal device comprising:
a first substrate including a pixel electrode and a first electrode;
a second substrate including a second electrode; and
a liquid crystal layer provided between the first substrate and the second substrate, wherein
upon the liquid crystal display function being activated, the pixel electrode is supplied with a pixel signal, and the first and second electrodes are supplied with common voltage, and
upon the touch sensor function being activated, the first electrode is applied with a first signal and the second electrode is configured to receive the first signal to be a second signal as a touch detecting signal;
the first electrode includes patterns of electrodes along a first direction, each of the patterns being configured to form a holding capacitor,
the second electrode includes patterns of electrodes along a second direction on the second substrate,
the patterns of the first electrode on the first substrate face the patterns of second electrode on the second substrate, and
the patterns of first electrode cross the patterns of second electrode in a planar view.

* * * * *